United States Patent
Miller

(10) Patent No.: US 10,570,045 B2
(45) Date of Patent: Feb. 25, 2020

(54) GLASS AND OTHER MATERIAL MELTING SYSTEMS

(71) Applicant: John Hart Miller, Aurora, CO (US)

(72) Inventor: John Hart Miller, Aurora, CO (US)

(*) Notice: Subject to any disclaimer, the term of this patent is extended or adjusted under 35 U.S.C. 154(b) by 0 days.

(21) Appl. No.: 14/999,391

(22) Filed: May 2, 2016

(65) Prior Publication Data

US 2016/0340219 A1 Nov. 24, 2016

Related U.S. Application Data

(60) Provisional application No. 62/230,007, filed on May 22, 2015.

(51) Int. Cl.
*C03B 5/02* (2006.01)
*C03B 5/04* (2006.01)
(Continued)

(52) U.S. Cl.
CPC .............. *C03B 5/1675* (2013.01); *C03B 5/03* (2013.01); *C03B 2211/40* (2013.01)

(58) Field of Classification Search
CPC ....... C03B 5/2356; C03B 5/2353; C03B 5/04; C03B 2211/22; C03B 5/235; C03B 2211/70; C03B 3/023; C03B 1/02; C03B 5/26; C03B 7/065; C03B 2211/40; C03B 3/00; C03B 3/026; C03B 7/06; C03B 2211/23; C03B 2203/04; C03B 2203/12; C03B 2203/14; C03B 2203/16; C03B 2203/42; C03B 37/01205; C03B 37/01208; C03B 37/0122; C03B 5/10; C03B 5/02–5/0277; C03B 5/03–031; F28D 2021/0049; F28D 9/0037; F28D 9/0043; F28F 13/12; F28F 2270/00; F28F 3/027; C03C 25/12; C03C 25/326
See application file for complete search history.

(56) References Cited

U.S. PATENT DOCUMENTS 1,541,142 A * 6/1925 Hilton ...................... C03B 5/10
65/173
1,860,082 A * 5/1932 Drake ...................... C03B 5/10
65/335
(Continued)

OTHER PUBLICATIONS

Three-Dimensional Numerical Simulation of Circulation and Heat Transfer in an Electrically Boosted Glass Melting Tank, IEEE Transactions vol. IA-22 Issue 5, first two pages.

(Continued)

*Primary Examiner* — Jodi C Franklin

(57) ABSTRACT

The invention includes systems and methods for melting materials to make glass and other materials subject to electric melting that improve the capacity of the melters and/or the melt quality and/or the melting costs and/or the life of tank melters. These systems and methods use one or more of boosting with one or more streams of super hot melt coming from one or more boosting melters, cooling one or more components of one or more of the melters normally cooled using water with a high temperature cooling fluid or fluid suspension and protecting the normally high wear areas of refractory linings by covering those high wear areas with one or more strips of a corrosion and oxidation resistant metal or alloy useful above 2400 degrees F.

10 Claims, 8 Drawing Sheets

(51) Int. Cl.
*C03B 3/02* (2006.01)
*C03B 5/167* (2006.01)
*C03B 5/03* (2006.01)

(56) References Cited

U.S. PATENT DOCUMENTS

| | | | |
|---|---|---|---|
| 3,147,328 A | 9/1964 | Bussy | |
| 3,332,758 A * | 7/1967 | Firnhaber | C03B 37/048 |
| | | | 373/35 |
| 3,376,373 A | 4/1968 | Bussy | |
| 3,429,972 A | 2/1969 | Bussy | |
| 3,580,976 A | 5/1971 | le Clerc de Bussy | |
| 3,659,029 A * | 4/1972 | De Bussy | C03B 5/0275 |
| | | | 373/35 |
| 3,876,817 A | 4/1975 | Bussy | |
| 3,912,488 A | 10/1975 | Sanford | |
| 3,983,309 A | 9/1976 | Faulkner | |
| 4,017,294 A * | 4/1977 | Sanford | C03B 5/0275 |
| | | | 373/33 |
| 4,023,950 A * | 5/1977 | Glaser | C03B 5/245 |
| | | | 65/135.1 |
| 4,029,489 A | 6/1977 | Froberg | |
| 4,029,887 A | 6/1977 | Spremulli | |
| 4,062,667 A * | 12/1977 | Hatanaka | C03B 5/00 |
| | | | 65/135.1 |
| 4,099,949 A | 7/1978 | Olds | |
| 4,143,232 A | 3/1979 | Bansal | |
| 4,146,375 A * | 3/1979 | MacPherson | C03B 3/00 |
| | | | 373/28 |
| 4,159,392 A | 6/1979 | Fineo | |
| 4,351,054 A | 9/1982 | Olds | |
| 4,351,664 A | 9/1982 | Bansal | |
| 4,352,687 A | 10/1982 | Boettner | |
| 4,366,571 A | 12/1982 | Palmquest | |
| 4,381,934 A * | 5/1983 | Kunkle | C03B 3/02 |
| | | | 65/134.4 |
| 4,600,425 A | 7/1986 | Krumwiede | |
| 4,600,426 A | 7/1986 | Schwenninger | |
| 4,611,331 A | 9/1986 | Palmquist | |
| 4,632,687 A * | 12/1986 | Kunkle | C03B 3/02 |
| | | | 65/136.1 |
| 4,638,490 A | 1/1987 | Dunn | |
| 4,652,293 A * | 3/1987 | Samejima | C03B 5/04 |
| | | | 65/134.9 |
| 4,738,938 A * | 4/1988 | Kunkle | C03B 3/02 |
| | | | 501/70 |
| 4,764,198 A * | 8/1988 | Lythgoe | C03B 5/03 |
| | | | 501/107 |
| 4,780,121 A * | 10/1988 | Matesa | C03B 5/00 |
| | | | 62/134 |
| 4,792,536 A * | 12/1988 | Pecoraro | C03B 3/02 |
| | | | 501/70 |
| 4,796,276 A | 1/1989 | Froberg | |
| 4,798,616 A | 1/1989 | Knavnish | |
| 4,812,372 A | 3/1989 | Kithany | |
| 4,819,247 A | 4/1989 | Seng | |
| 4,831,633 A * | 5/1989 | Argent | C03B 3/02 |
| | | | 373/32 |
| 4,862,477 A | 8/1989 | Olds | |
| 4,897,853 A | 1/1990 | Argent | |
| 4,919,700 A * | 4/1990 | Pecoraro | C03B 5/20 |
| | | | 65/134.2 |
| 5,151,918 A | 9/1992 | Argent | |
| 5,188,649 A | 2/1993 | Macedo | |
| 5,340,372 A | 8/1994 | Macedo | |
| 5,346,524 A | 9/1994 | Shamp et al. | |
| 5,417,732 A * | 5/1995 | Shamp | C03B 5/04 |
| | | | 432/195 |
| 5,471,496 A | 11/1995 | Becker | |
| 5,550,310 A | 8/1996 | Richards | |
| 5,573,564 A | 11/1996 | Richards | |
| 5,600,669 A | 2/1997 | Pieper | |
| 5,643,350 A | 7/1997 | Mason | |
| 5,709,728 A * | 1/1998 | Fleckenstein | C03B 3/00 |
| | | | 65/134.6 |
| 5,961,686 A * | 10/1999 | Chenoweth | C03B 5/0275 |
| | | | 65/134.1 |
| 6,044,667 A | 4/2000 | Chenoweth | |
| 6,101,847 A | 8/2000 | Shamp | |
| 6,178,777 B1 | 1/2001 | Chenoweth | |
| 6,227,007 B1 | 5/2001 | Palmquist | |
| 6,237,369 B1 * | 5/2001 | LeBlanc | C03B 5/04 |
| | | | 65/134.1 |
| 6,314,760 B1 | 11/2001 | Chenoweth | |
| 6,334,337 B1 | 1/2002 | Macedo | |
| 6,398,547 B1 | 6/2002 | Joshi | |
| 6,418,755 B2 | 7/2002 | Chenoweth | |
| 6,705,118 B2 | 3/2004 | Simpson et al. | |
| 6,722,161 B2 | 8/2004 | LeBlanc | |
| 6,912,874 B2 | 7/2005 | Kunert | |
| 6,983,006 B2 | 1/2006 | Miyazaki | |
| 7,007,515 B2 | 3/2006 | Dick | |
| 7,108,808 B1 | 9/2006 | Richards | |
| 7,225,643 B1 | 6/2007 | Guerrero | |
| 7,475,569 B2 | 1/2009 | Baker | |
| 7,565,819 B2 | 7/2009 | Jeanoine | |
| 8,561,430 B2 | 10/2013 | Palmarieri | |
| 8,707,739 B2 | 4/2014 | Huber | |
| 9,133,049 B2 * | 9/2015 | Shelestak | C03B 5/173 |
| 2006/0105899 A1 * | 5/2006 | Jacques | C03B 5/2356 |
| | | | 501/56 |
| 2008/0256981 A1 * | 10/2008 | Jacques | C03B 3/02 |
| | | | 65/19 |
| 2010/0126218 A1 * | 5/2010 | Shelestak | C03B 5/173 |
| | | | 65/30.1 |
| 2010/0126223 A1 | 5/2010 | Thomas | |
| 2011/0126594 A1 * | 6/2011 | Matsui | C03B 3/026 |
| | | | 65/126 |
| 2011/0308280 A1 | 12/2011 | Huber | |
| 2012/0077135 A1 | 3/2012 | Charbonneau | |
| 2014/0013806 A1 | 1/2014 | De Angelis | |

OTHER PUBLICATIONS

Improving Residence Time Distribution in Glass Melting Tanks Using Additionally Generated Lorentz Forces by Soubeih et al Mar. 2015 Jour. of Chem. Engr. (2015. 203-210).

Platinum Bubbler Tubes in Glass Melting Platinum Metals Review, 1963, 7 (1page), 7.

* cited by examiner

Sheet 2

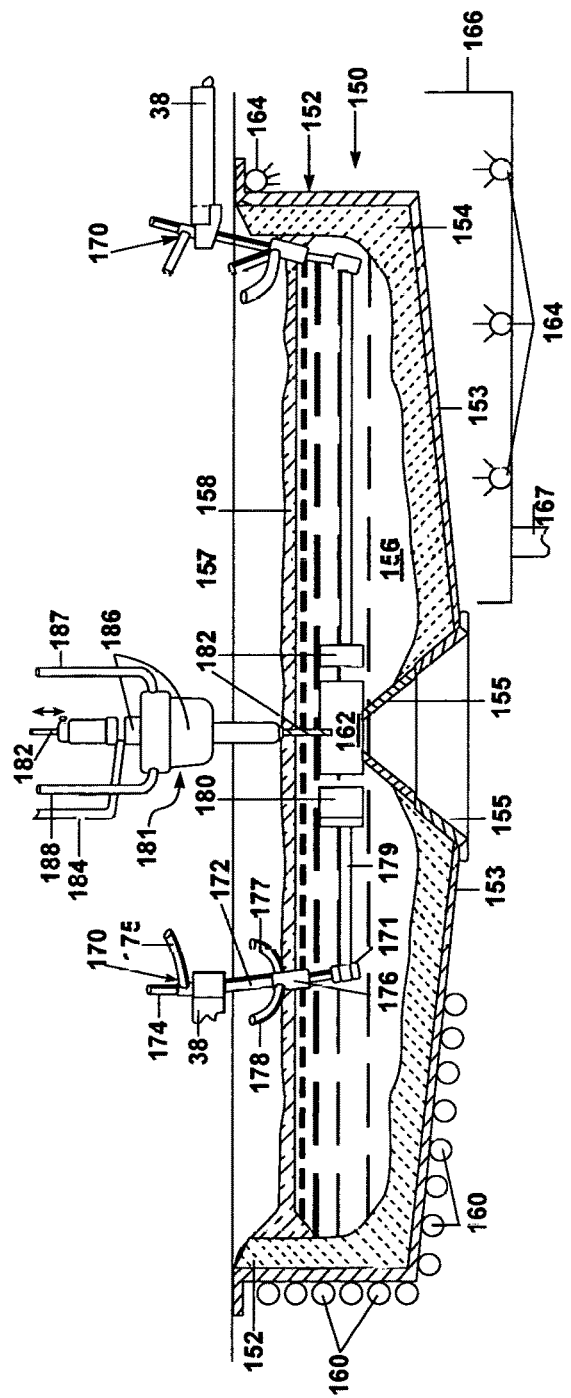
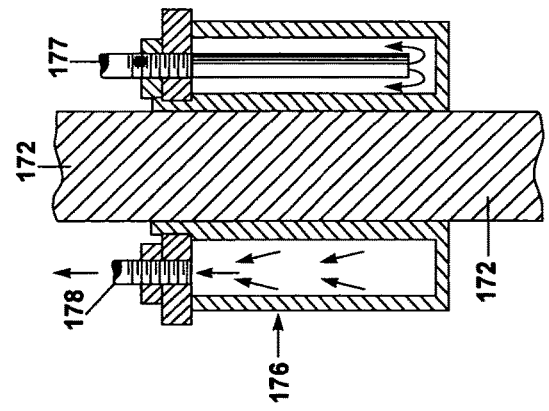
Figure 12 (Prior Art)
Figure 13 (Prior Art)

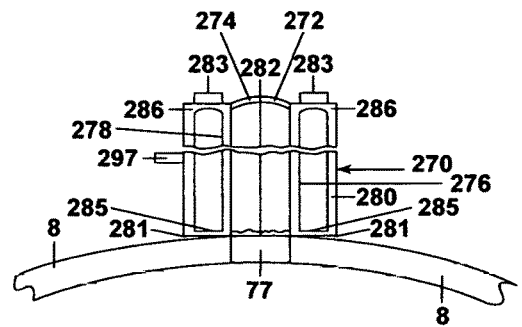
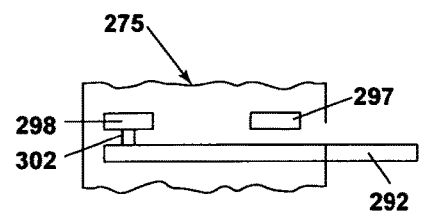
Figure 18
Figure 16
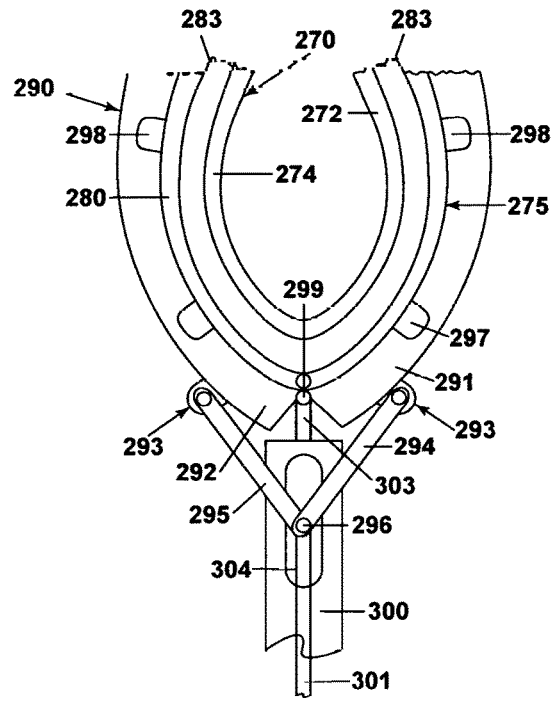
Figure 17

GLASS AND OTHER MATERIAL MELTING SYSTEMS

This application claims the benefit of Provisional patent application 62/230,007 filed on May 22, 2015.

The invention includes new high productivity glass melting tank systems, booster systems for glass tank melters and methods of melting glass and boosting tank type glass melters. These systems and methods optimize the hot spot location and improve the melting productivity and/or the quality of the glass melt. The results can be further enhanced by new systems and methods used to prepare the batch by pelletizing and to cool one or more parts of the electric melter(s) used to boost the capacity of the tank melters and also for cooling parts of the tank melters.

BACKGROUND

There are many systems and prodcesses for melting glass from glass batch and/or cullet and several systems and ways of increasing melting capacity of tank type melters. For example, It is known to add electrodes through the sides and/or through the bottom of the tank to increase capacity, to preheat batch and to preheat combustion air for improving melting capacity and/or melt quality in tank type glass melters. It is also known to employ oxygen-fuel burners, in a number of various kinds of tank melters to supplement or totally replace the air-fuel burners. The oxygen-fuel burners produce a hotter flame and greater heat transfer than that of air-fuel burners. Oxygen/fuel burners are designed to fire parallel or substantially parallel to the surface of the glass, or are mounted in the crown to direct the flame(s) downward towards the unmelted batch and/or the melt. These burners transfer heat upward into the furnace crown and surrounding refractories as well as into the batch and glass. Heat transfer is achieved by convection, direct radiation from the flame and by re-radiation from the refractory superstructure of the glass furnace. It is also known to preheat the oxygen and/or the gaseous fuel for achieving a hotter flame temperature and faster melting and to move the hot spot closer to the batch end of glass tanks. While these systems and methods have suceeded in increasing melting capacity of the same size tank melters, and in moving the "hot spot" further towards the batch feed end of the tank, the location of the "hot spot" still remains a considerable distance from the optimum desired area that would melt the incoming glass batch faster and better. Also, it is very expensive to enlarge a tank melter, even if the room is available, and even far more expensive to build a new tank melter and all its peripherals, still providing room is available, than to increase the capacity of an existing tank melter and to add on additional forehearth and bushings or other glass forming equipment.

The capacity of the glass tanks are usually limited by the highest temperature of the refractory lining within the melting chamber, particularly on the hot face. Accordingly, one concern in the use of oxygen-fuel burners has been the risk associated with the very high temperature of the burner flames and overheating of the refractory roof and walls of the furnace. It is known from U.S. Pat. Nos. 5,346,524, 6,237,369 and 6,398,547, to provide a refractory lined glass melters for producing refined glass from raw glass-forming material and to use oxy-fuel burner(s) in the tank crown to produce the heat needed to melt glass batch and to refine the resulting molten glass. The oxygen-fuel burner or burners have an inner central cylindrical fuel conduit for providing gaseous fuel and an outer cylindrical oxygen conduit concentric with the central fuel outlet for providing oxygen. The method using such a furnace for producing refined glass from raw glass-forming material in the refractory lined glass melter includes the steps of charging raw glass-forming material to the melting zone of the glass melter. The velocity of the gaseous fuel and the oxygen from the oxygen-fuel burner is controlled such that the velocity of the gaseous fuel and the oxygen are substantially equivalent to provide a generally laminar gaseous fuel flow and generally laminar oxygen flow to combust proximate a top surface of the raw glass-forming material and produce a flame which impinges the surface of the raw glass-forming material and which has a middle portion of an approximately columnar shape. The flame melts the raw glass-forming material within the melting zone by means of the flame coverage from the at least one oxygen-fuel burner without having to use regenerators or recuperators to provide preheated air. Refined molten glass is then withdrawn from the fining zone.

It is also well known to use electric boosting in the air-fuel or oxy-fuel fired furnaces by locating a plurality of electrodes beneath the molten glass to provide a means for adding heat to the molten glass to increase the capacity of the air-fuel or oxy-fuel fired glass tanks. Electric furnaces for melting glass are also well known, but in starting such furnaces the glass batch must initially be melted using combustion burners until sufficient molten glass is produced to cover the electrodes. All electric melters have not proven economical in many instances for processes requiring high tonnage melting rates such as required for products such as E glass continuous fibers, containers such as jars and bottles, tableware and flat glass for windows and display cases. Conventional all electric tank type melters also are not normally used to melt E (electrical) glass for making continuous glass fiber products due to the low electrical conductivity of molten E glass at normal molten glass temperatures.

It is also known from U.S. Pat. No. 6,983,006, to melt and refine glass comprising the steps of: charging glass raw materials into a tank type furnace whose side wall's height is twice or more than twice as long as an inside dimension of a bottom of the furnace so as to thermally melt the glass raw materials; heating molten glass obtained by thermally melting the glass raw materials with heating electrodes that jut from the side wall so as to increase the temperature of the molten glass and that are placed at different levels from the bottom of the surface; charging further glass raw materials into the furnace so as to make a surface level of the molten glass twice or more than twice as high as the lowest level of heating electrodes among the group of electrodes; convecting the molten glass above the heating electrodes while the molten glass is being heated with the heating electrodes; and discharging the molten glass from the bottom of the furnace. Further, in the course of moving down the deep furnace, any air or gas bubbles, seeds, will only go down so far due to their lower density so the seedless molten glass may then be discharged at or near the the bottom of the furnace through an orifice feeder. Such melters are sometimes known as Sorg melters.

More recently it is known to melt glass using burners submerged in the molten glass putting the hot flames of air/gas or oxygen gas, with or without preheat, into the molten glass itself as disclosed in United States patents including U.S. Pat. Nos. 7,428,827, 7,565,819 and 8,561,430. As evidenced by published United States patent applications 2011/0308280 and 2012/0077135, problems have been encountered in submerged burner glass melting, namely severe frequency and/or amounts of molten glass foam, gaseous bubbles and seeds, in the hot molten glass making it difficult, expensive or impractical, to refine for many products.

Most, if not all, of the above described processes and melters were aimed towards improving the capacity of the tank type glass melters and/or to improve the quality of the molten glass and/or to move the "hot spot" closer to the batch entry end of the melter and away from the walls of the melter. However, while these processes and melters have suceeded to varying extents, none have moved the "hot spot" sufficiently to optimize capacity of the existing melters while maintaining desired or acceptable molten glace quality.

Kettle type glass melters, (KTEMs), the E stands for electric, are also known for use in melting glass and even more refractory non-metallic materials as disclosed in U.S. Pat. Nos. 4,017,294 and 4,023,950, 4,143,232, 4,159,392 and 5,643,350, and side discharge melters of this type are disclosed in U.S. patent Nos including U.S. Pat. Nos. 5,961,686, 6,044,667, 6,178,777, 6,314,760 and 6,418,755, 4,017,294, the disclosures of which are hereby incorporated herein by reference. The '294 patent generally describes an open-top electric melter, or furnace, having a central bottom discharge outlet. The melter includes a ceramic lining and a molybdenum outlet member located at the bottom of the melter, at the center thereof. The tapping block of the outlet is made of molybdenum, a material which is able to withstand high temperatures within the furnace and is substantially corrosion resistant. Because the molybdenum tapping block readily oxidizes at the operating temperature, it and the molybdenum exlectrodes that either enter the molten glass through the metal sides of the kettle or through the batch cover on top of the molten gllass must be cooled below their oxidizing temperature and that is done with water cooling as is the metal shell containing the refractory lining and the molten glass. Sometimes a platinum or platinum/rhodium alloy metal is used for an extension of the molybdenum tapping block or orifice and it also is water cooled.

Unfortunately, KTEM glass melters which include outlets located at the bottom center of the melter as disclosed in U.S. Pat. Nos. 3,580,976, 3,659,029, 3,876,817, 3,912,488, 4,017,294, 4,146,375, 4,366,571, 5,573,564, 5,643,350, the disclosures of which are hereby incorporated herein by reference, or even at a side discharge kettle melter as in U.S. Pat. No. 5,961,686, produce glass melt discharge having much higher temperatures than achieved in normal tank type melters, temeratures significantly higher than 2300 or 2400 degrees F. such as above 2425, 2450, 2475, 2500, 2550, 2600, 2650, 2700 or even above about 2,800 or 2,900.degrees to 3,200.degree. F. melt temperatures, higher than is desired for entering a refining section and/or for shaping the glass into the final product, thus requiring coiling in some manner to lower the temperature to that desired, usually below 2,300 degrees F. Accordingly, due to these higher than desired glass temperatures and air bubbles in the hot glass it is necessary to further refine the hot glass before shaping it into a product. One method of apparatus for doing this is a side discharge for the hot glass into a refining chamber as shown in U.S. Pat. No. 5,961,686. In such melters the side-discharge outlet can include an elongated tube comprised of a substantially corrosion resistant metal, and having an entrance end and an exit end thereby to define a molten glass flow communication path between an interior of the melter and a conditioning forehearth.

Kettle melters (KTEM's) of the above types and other types such as stir melters, as shown in U.S. Pat. Nos. 4,143,232, 4,159,392 4,366,571, 5,573,564, 5,643,350 and have been used extensively in the process of melting glass where the production rate is normally substantially less than that produced by conventional glass tanks that can produce at least about 75 tons per day of refined molten glass and usually a much higher rate. Because of their lower melting and refining capacities, lower refractory lining life and the usually higher cost of using all electric melting to melt glass for such uses as making continuous glass fiber, containers, tableware, flat glass and other high tonnage demands, the kettle type melters have not been used to supply large tonnages of molten glass. Another shortcoming of kettle melters for delivering molten glass is that the temperature of the molten glass coming from kettle melters is hundreds of degrees F. higher than desired for glass forming into glass products, thus requiring equipment to cool the molten glass to the desired temperatures, wasting energy and adding to the capital and operating costs. Another problem with the kettle type melters is that one or more of the electrodes, normally molybdenum, the cooling cans protecting the electrodes and needle at the melt line, normally stainless steel, and the orifice outlet, normally a platinum alloy or molybdenum and the melter shell, normally steel or stainless steel, must be cooled to protect against overheating and failing and this is done using water that drains a lot of heat energy away from the melting objective. The discovery of new natural gas and crude oil reserves and technologies to free them up has greatly lowered the cost of natural gas and made gas fired melting tanks the lowest cost for melting glass, thus extending the use of fossil fuel and gas fired tank melters for the forseeable future.

KTEMS of the above types and other types have been used extensively in the process of melting glass where the production rate is normally much less than that produced by conventional glass tanks that can produce at least at least 75 tons per day of refined molten glass and usually much higher rates. Because of their lower melting and refining capacities, lower refractory lining life and the usually higher cost of using all electric melting to melt glass for such uses as making continuous glass fiber, containers, tableware, flat glass and other high tonnage demands, KTEMS have not been used to supply large tonnages of molten glass. An advantage of KTEMS is that they will melt almost any material having a relatively high electrical resistance in the molten state, but the higher the melting point of the material, the higher the temperature of the melt discharge. Another shortcoming of KTEMS for delivering molten glass is that the temperature of the molten glass coming from KTEMS is hundreds of degrees F. higher than desired for glass forming into glass products, thus requiring additional equipment such as air or water cooled pots or long forehearths to cool the molten glass to the desired temperatures, wasting energy and adding to the capital and operating costs. The discovery of new natural gas reserves and technologies to free them up has greatly lowered the cost of natural gas and made gas fired melting tanks desirable for melting glass, thus extending the use of gas fired tank melters for the forseeable future.

Another undesirable feature of electric kettle melters is that the shell, being water cooled, often has to meet boiler standards and regulations. Another problem is the difficulty of heating of a new refractory lining upon startup to avoid severe damage to the refractory lining due to an excessive rate of heating by the molten material. Since the exterior of the refractory lining is against a water cooled shell, it has a temperature of only about 200 degrees F. while the temperature of the molten material on the opposite side of the lining is often well above 2200 degrees F. This large thermal gradient within a sintered or ceramic bonded refractory lining causes severe stresses in the refractory causing cracking and spalling. Also, this large thermal gradient through the lining results in a large and costly heat loss. from the melter causing the electrical efficiency of melting in kettle melters to be substantially lower than in conventional tank type melters.

To reduce refractory spalling problems due to thermal shock or due to steam explosions of cast linings containing water, it is customary to heat the interior of the refractory lining with gas fired burners or electric element panels to dry out the lining and/or to heat up the lining several hundred degrees F. prior to the beginning of the melting process. During this time water must be circulated through the shell to keep it cool enough to avoid steam generation in the cooling system of the shell. This relatively cold shell against the refractory lining causes the lining heat up time to be longer, and when the electric kettle melter is down for lining rebuild, downtime is extremely costly for every hour and minute the melter is not melting the desired material. These disadvantages substantially increase the cost of melting in these types of kettle melters and therefore limit their use in spite of their ease of operation. This disadvantage is becoming more important as the exhausts of fossil fuels used in conventional tank type melters is said to cause environmental problems and objections to increased use is likely to increase even faster in the future, while electric power has the advantage of being produced by nuclear, solar and wind generated electrical power, and other more environmentally desirable sources. Thus, there is a pressing need to further improve and minimize the above described problems with electric kettle type melters.

Much work has been done to replace air-fuel fired glass tanks, with or without recuperators and/or regenerators, with oxy-fuel fired burners, with or without electric boosting using electrical powered submerged electrodes. Because of the relatively long life of such furnaces, usually in excess of 5 years and often several years more than 5 years, these glass tanks often fall short of meeting the need for more capacity to exploit the capacity of the molten glass forming equipment downstream and the need for more product production. Building new glass melting tanks, and the related molten glass forming equipment, such as fiber forming rooms, etc., require large amounts of capital and time, e.g. more than 50-100 million dollars. Projects such as this typically require months of time for preparation and approval and at least a year or more from approval of funds to production. Thus, efforts continue to increase the melting and refining capacity of existing glass melting tanks to be able to reap the large profit potential, reduced capital investment and time savings substantial added capacity can produce.

During the past decade a lot of work to develop the concept of submerged melting using natural gas and oxygen have been evaluated, but foam formation, the difficulty or impossibility of avoiding foam, see U.S. Pat. No. 8,707,739, with the difficulty of addressing the foam problem has greatly limited this technology. Further, much work has been done as evidenced by a substantial number of patent applications filed covering ways to address the foaming problem, but the desire continues to move the "hot spot" further towards the batch feed end of tank melters. Progress has been made, but their still remains substantial need to maximize the melting rate and to improve glass quality and/or efficiency in tank melters and to move the "hot spot" significantly closer to the batch feed end of the tank melters. While oxy-fuel firing has helped greatly, the very hot oxygen-natural gas flames remain above the melt, foam and floating batch limiting the heat penetration needed to move the "hot spot" to the desired location. Submerged burner melting is an attempt to further improve melting, but an undesirable result of foam generation persists. Work continues to find a way to achieve the desired results.

Therefore, there still exists a need for better systems and methods of boosting the capacity and capability of existing tank type glass melters and also for improving the electrical efficiency of kettle type electric melters and all types of HSM melters that use water cooling to cool one or more of electrodes and/or the shell and/or the discharge orifice or outlet.

SUMMARY OF THE INVENTION & BEST MODE

The invention includes systems and methods for feeding one or more streams of super hot melt onto a batch cover layer, foam layer or melt bath in tank type melters to take advantages of fossil fuel fired and/or electric fired or boosted tank melters of all types to increase the capacity of these tank type melters while also moving the "hot spot" to at or near the desired location and reducing the operating cost of producing molten glass and other inorganic materials, and doing so in sufficient quantity to move the "hot spot" in the tank type melter closer to the batch feed end of the tank melter. This is accomplished by mounting one or more melters (hot shot melters, HSM's) that discharge one or more streams of super hot melt at a level above the level of the batch layer and/or foam layer or melt layer in the tank type melter. The one or The invention comprises systems and methods for boosting the capacity of tank melters beyond their current capacity using one or more of the known techniques described above, improvements for cooling and preheating and operating HSM's (Hot Shot Melters). The first is accomplished by a system that mounts one or more kettle type melters or other bottom or side discharge melters above the metal or melt line of the tank melter and feeding one or more streams of super hot molten glass, having a temperature as the molten glass exits the outlet of the melter significantly above 2400 degrees F., preferably above any temperature in the range of 2425 degrees F. or hotter, e.g. above, 2450, 2500, 2525, 2550, 2575, 2600 degrees F. and even hotter, downward onto the top of the foam layer, batch layer or exposed molten glass bath in the tank type melter. For purposes of describing the invention, the bottom or side discharge HSM melters mentioned in this paragraph and below often include inorganic material melters that have a cooled metal shell around the bottom and at least a portion of the side or sidess of the melter, these types of melters are part of a group of melters hereinafter called HSM melters.

Preferably, the one or more kettle type melters and/or other HSM bottom or side discharge melters are so mounted that they can be removed from over or beside the tank type melter for repair or rebuilding while an operational kettle type or bottom or side discharge type HSM melter can be moved into the operating position to prevent an upset of the tank type melter due to significant change in throughput and/or heat input. Preferably at least two streams of the super-hot molten glass are passed through a crown or wall of the tank to flow into an area away from the sidewalls of the tank that would otherwise be covered with unmelted batch or foam. Each super-hot stream or stream of glass will normally, after a short while of running, melt out a column through the unmelted batch or foam considerably larger than the diameter of each super-hot molten glass stream. The invention includes systems that include one or more HSM melters that deliver one or more super hot streams of super hot melt into a foam layer and/or batch layer floating on top of a melted batch layer in a tank type melter wherein the tank type melter is heated by submerged electrodes, fossil fuel or both. The invention includes systems comprising a mount for one or more HSM melters and one or more HSM type melters, each having either a bottom or a side discharge outlet, the one or more HSM type melters and their outlets being positioned above the melt line of a tank melter so as to feed one or more streams of super hot molten material having a temperature as the molten material exits the outlet(s) of the HSM melter(s) significantly above 2400 degrees F., and methods for melting materials to make glass, a refractory material or other inorganic material using such systems. Usually the outlets of he HSM type melters are located above the top of the tank type melters, at least above the generally horizontal flame zone above the top of the batch or foam layers in the tank type melters, but if there is no generally horizontal flame zone, such as in an electric tank type melter, the outlet(s) of the HSM type melter(s) can be below the top of the tank type melter.

Often there is very limited space down the sides of an operating tank type melter as there may be other production or auxiliary equipment close by one or both sides, or there may be another tank type melter close by. Therefore often it will be important that the supporting structure for the compact melter(s) take up very little floor space on one or both sides of the tank type melter In some cases the supporting structure can be located behind the back end of the tank type melter, but often the batch feeding equipment prohibits this. The structure supporting and allowing the compact melter(s) to be quickly moved into and out of operating position can be of various types. For purposes of the invention, the operating position will be where the exiting stream(s) of very hot molten glass can drop into the molten glass within the tank type melter. One type of supporting structure pivots a horizontal structure supporting at least one HSM melter that when the horizontal structure pivots it either moves an HSM into an operating position from a repair and heat up position or moves an HSM out of an operating position, or both.

The invention includes systems and methods for melting batch comprised entirely or mostly of non-metallic inorganic materials to produce molten material, often molten glass, prior to forming using the advantages of HSM melters, including kettle type melters and the advantages of fossil fuel fired and/or electric fired or boosted tank melters of all types to increase the capacity of these tank type melters while also moving the "hot spot" to at or near the desired location and reducing the operating cost of producing molten glass. The invention accomplishes this by using one or more kettle type electric melter(s) (hereafter designated KTEMS) and other HSM melters that, like KTEMS, discharge super-hot molten glass at temperatures of at least about 2400 degrees F., preferably higher such as above any temperature in the range of 2425, 2450, 2500, 2525, 2550, 2575, 2600, 2650, 2675, 2700 degrees F. or higher to supply one or more streams of super hot molten melt, including glass, into the foam or floating batch area and on into the molten glass therebelow into tank type melters. These HSM melters will melt any inorganic material having a high electrical resistance as is well known.

Another inventive feature of the above systems and methods is to oscillate or move the KTEM type or KTEM types back and forth above the tank type melter, thus moving the exiting super hot molten glass stream back and forth to drop through an elongated opening in the crown to drop onto the foam or batch layer floating on a bath of molten glass in the tank type melter. This movement of the stream or streams of super hot molten glass will enlarge the hot spot(s) in the furnace thus increasing the melt rate of the batch and/or disapation rate of the foam further increasing the melt capacity of the tank type melters and/or further increasing the quality of the molten glass exiting the tank type melter. Still another feature of the invention is to use one or more side delivery HSM melters and transport the super hot stream (s) of melt through the side wall(s) of the tank melter using the transport assembly described less the insulation inside the tank melter, instead of through openings in the crown, and this will permit the HSM melter(s) to be mounted at a lower elevation if so desired.

It is also another part of the present invention to use a further capability advantage of the HSM including KTEM melters of the boosting type described, electric melters, to melt the more refractory materials, like silica sand, silica compounds, clays, alumina compounds and to add then to the tanks alter the the batches containing the rest of the batch materials have been fed to the tank type melter being boosted. The most difficult ingredient in glass batches to melt is silica sand, usually a major ingredient in most glass batches. Thus optionally the composition of the batch fed to the kettle melter(s) can be much higher in silica and optionally other hard to melt ingredient(s), like clay or alumina or aluminum compounds, than the resultant refined molten glass while the batch fed to the tank being boosted can be low in silica and optionally other hard to melt ingredients. Doing this will also significantly increase the temperature of the molten glass stream(s) coming from the HSM type melters.

The invention also includes systems and methods for cooling, and/or preheating, KTEMS and furnaces that discharge molten glass having temperatures above about 2400 degrees F., preferably above any temperature in the range of 2425, 2450, 2500, 2525, 2550, 2575 or 2600 degrees F. or higher, while melting batch to produce molten glass prior to forming, cooling systems and methods resulting in improving the electrical efficiency and productiviity of the KTEMS by using high temperature heat transfer fluids in place of water or water based coolants that have a maximum practical use temperature of significantly less than 215 degrees F. The high temperature heat transfer fluids used in the systems and methods of the invention have a practical use temperature of at least 225 degrees F. and preferably at least 250, 275, 300 or 350 degrees F. such as 375, 400, 425, 450, 475, 500, 525, 550, 575, 600 and up to about 750 degrees F. and even higher temperatures. Since platinum, platinum-rhodium and other platinum and/or rhodium alloys and molybdenum and other precious and refractory metals and even steel and stainless steel alloys have safe use temperatures above 750 degrees F. Allowing these metals and metal alloy parts to operate at these higher temperatures both increases the electrical efficiency of KTEMS and other furnaces that discharge molten glass at temperatures of 2600 degrees F. and higher, and also can Increase the temperature of the discharged molten glass significantly, the latter being a distinct advantage to using these types of glass melters to boost the performance of tank melters according to the invention.

The boosting HSM melters of the type described above and herein may normally have a refractory life much shorter than that of the tank melters and therefore each HSM melter may have to be taken out of operation to replace the refractory lining and possibly other parts one or more times during the life of the tank type melter being boosted.

Preferably, to avoid excessive downtime of the HSM melters, and possible upset of the tank when it becomes necessary to take the HSM melter(s) out of operation, the present invention also provides in some system(s) and method(s) one or more standby, fully repaired and operational HSM melters that can be quickly moved into the operating location of the shut down boosting melter(s) when the latter are taken out of position for repair or rebuilding.

The boosting systems and methods of the invention also include optional features of apparatus and methods of moving the one or more streams of super-hot melt back and forth in varioius directions, in a circular or oval paths or other paths to increase the area of batch or foam cover that is melted, defoamed and the area and volume of molten material affected in the tank melter, i.e. the melt that is heated further by the super-hot stream(s) of melt. This is accomplished by moving the HSM melter(s) or by intercepting each stream of super-hot melt with a refractory diverter that oscillates or moves in any desirable direction or to form a repeating or programmed variety of patterns or paths. This will often require larger openings in the crown or top of the tank melter, including slots, ovals, circles, or other shapes to allow the moving stream to pass through without contacting the walls of the opening. To prevent excessive exhaust gas loss and heat loss from the tank through such openings and the problem of undesirable heating the bottom(s) of HSM melters, one or more movable refractory shields having a small opening for each stream of super-hot melt to pass through and to reflect the radiant heat and hot gases back into the tank and to keep hot gases away from the HSM melters, can be used. One material that can be used is a layer of fused silica attached loosely to a refractory metal backing, the latter attached to the mechanism for moving the shield with the moving stream of molten, super-hot glass.

Many types of melters that are relatively small, compared to tank type melters, and discharging one or more streams of super hot melt, having temperatures of at least about 2400 degrees F., preferably above any temperature in the range of 2425, 2450, 2500, 2525, 2550, 2575 or 2600 degrees F. or even higher, have been described above. For purposes of this disclosure the above described melters and other melters meeting these requirements such as that disclosed in U.S. Pat. No. 5,643,350, and the like are referred to as a Hot Shot Melter (HSM).

The invention also includes methods of cooling, and preheating, the HSM melters, tank type sub-components including booster electrode and bubbler cooling and including the KTEM type melters comprising using a high temperature heat transfer fluid having a use temperature above 225 or 250 degrees F. as described in the cooling systems described above, in place of water cooling. While the invention is useful on many other types of melters, the preferred type of melter meeting the above description are kettle type electric melters (KTEM) and the invention will be described in detail mainly using its application on this type of melter. The invention reduces energy usage and/or substantially increases the melting capacity of the same size KTEMs by replacing the cooling water in at least one of the conventional water cooling systems on KTEMs with a high temperature capability fluid including high temperature capability liquids or high temperature capability liquid suspensions that can be heated to temperatures of at least 225 or at least 250-300 degrees F. and/or higher, preferably much higher before exiting the one or more cooling systems of a KTEM. The term KTEM defines various shapes and types of "kettle type electric melters" having a fluid cooled metal or metal alloy shell containing a hot melt and usually a refractory lining adjacent the shell for containing the hot melt. The high temperature capability fluids used in the cooling systems of the invention permits an exiting high temperature capability higher than currently practical with water cooling, yet within the temperature capabilities of the refractory metals used in the melters and even the refractory linings, albeit the refractory life may be reduced somewhat, but economically so. Fluids to be at temperatures above at least 225 or at least 250 or 300 degrees F., more typically a temperature above at least any temperature in the range of about of about 225 or 250-750 degrees F. and actually at any temperature between about 250 or 300 degrees F. or 350 degrees F. or 400 degrees F. or 450 degrees F. or 500 degrees F. or 550 degrees F. or 575 degrees F. or even higher up to any temperature in the range of about 576 to about 750 degrees F. The invention also includes additional equipment and steps to heat the high temperature heat exchanging fluids to a high temperature to preheat the shell and refractory lining of the KTEM(S) and other HSM melters. This is done prior to start up following a refractory lining rebuild, repair or a shutdown in which the refractory lining is at, or near, room temperature. This preheating of the lining from the shell side inward according to the invention allows faster heat up while reducing thermal shock, cracking and spalling of the refractory lining and substantially decreases the heat-up time. The heat exchange fluid can be preheated in known external heating systems to hundreds of degrees F. and to or near their maximum use temperature over a short time to heat the backside of the refractory lining while burner(s) in the interior of the HSM, KTEM or other melters are used to heat the inside of the refractory lining and produce melt covering the electrodes to enable the electrodes to assume the further melting of batch fed to the melter(s).

The invention also includes a system including one or more HSM, including KTEM melters, including one or more known batch pelletizing devices, and methods of melting batch to make glass or a refractory product in an HSM, including KTEM melters wherein the batch fed to the KTEM is first pelletized in pellets, wafers or spheres or similar shapes having a maximum diameter of about 6 inches, preferrably less than about 3 inches, and a maximum thickness of about 1 inch, preferably less than about 0.6 inch. The size of the pellets should preferably be small to better cover the melt in the KTEM preventing or minimizing radiation losses from the melt. Pelletizing the batch will substantially reduce dust in the area of the KTEM and also increase the melting rate of the KTEM.

The Invention also includes metal or metal alloy surface linings for glass melters, especially for use in the fastest wear areas of the refractory linings of the melters, and methods of lining glass melters to substantially increase the life of the glass melters by using thin sheet(s) of precious metal and/or of a refractory and corrosion resistant metal alloy, attached to the surface of the refractory lining, especially in the areas of fastest wear of the melter linings. The preferred precious metal or alloys are those containing at least 35 wt. percent of Rhodium including Rhodium metal, with or without one or more other precious metals and/or refractory metals. The highest wear area on the linings is at, several inches above and several inches below the metal line, also, in the bottom of melters using bottom electrodes around the holes where the electrodes come through the refractory lining, and also in the sidewalls of electric melters in the sidewall linings for a distance out from where the electrodes come through the sidewall linings.

Platinum, Rhodium, Irridium, Paladium prices have been declining generally since 2008 due to reduced glass manufacturing and new technologies on both the precious metals mining and recovery areas and new technologies in the precious metals use processes. Because of this, and the much lower density of Rhodium compared to the other precious metals, it is now much less expensive, and ties up much less capital, to use Rhodium and alloys containing substantial amounts of Rhodium in high temperature applications than it has been for many, many years. Also, in the past when the price of Rhodium dropped substantially it was due to a recession, a time when users of Rhodium were trying to reduce capital spending and operating expenses, usually by cutting Research and Development costs substantially, and by the time that policy was changed, the price of Rhodium had risen and was rising rapidly and it was too late to start research on ways to use more Rhodium in alloys being used and new uses of Rhodium.

The types of Rhodium, (Rh), alloys most usable in protecting high wear areas of glass melting furnaces include Rh plus one or more of Platinum, Irridium, and also Paladium, Tungsten, Rhenium, Ruthenium, Osmium, Tantalum, Silicon, Scandium, Titanium, Vanadium, Chromium, Manganese, Nickel, Yytrium, Zirconium, Niobium, Holmium, Erbium, Thulium, Lutetium, Hatnium, Tantalum, Thorium, Platnium, Rhenium, Ruthenium, and Irridium being the most preferred alloying metals and Tungsten, Tantalum, Chromium, Nickel and Zirconium being also preferred. Alloys of Rh containing more than 35 wt. % Rh, more preferably more than 40 or 45 wt. %, and alloys having similar high temperature properties, especially the properties of strength, oxidation resistance and corrosion resistance to molten glasses at temperatures as high as 2400, 2500, 2600, 2700, 2800 and 2900 degrees F. and higher.

The protective sheet(s) can be attached to the refractory lining In several ways including folding over a short length and inserting the folded over strip or strips into joints between refractory blocks or into a slit cut in the refractory blocks or lining and using refractory cement on the back side of the sheet or with and/or in the joints or slit in the refractory blocks. The sheet(s) can also have a few spaced apart holes therein and headed pins of the same metal or alloy as the sheet can be put through the holes and into appropriate located holes drilled into the inner faces of the refractory lining blocks or other lining.

Most of the protective precious metal refractory metal or an alloy of two or more of these metals will survive the life of the furnace and can be recovered by known processes, even if some has penetrated the refractories adjacent the protective sheets. This either makes the use of the protective sheets economically feasible or makes their use even more financially attractive.

The benefits of the present inventions are numerous and substantial in cost reduction for melting inorganic materials whose melts have electrical conductivities suitable for using electrode heating of the melts and melting of the batches, such as glasses, refractories and similar materials. For example, according to U.S. Pat. No. 4,366,571, the general rule is that for every 100 degrees C. increase in melt temperature, the rate of melting of glass batch doubles, thus the capital costs and other overhead costs will be significantly reduced. High melting temperature glass batches can be melted easier and at faster rates than heretofore. Less energy will be wasted by removing heat from the various water cooled devices and containers with the present invention. These are just a few of the many advantages provided with the disclosed inventions.

Herein, when a range of number values is disclosed it is to be understood by those of ordinary skill in the appropriate art(s) that each numerical value in between the upper limit and the lower limit of the range is also disclosed, to at least 0.01 of a full number. Thus in a range of 1 to 10, this includes 2.04 to 10, 3.06 to 8 or 8.50, and so on. The addition of a new limitation in a claim previously stating from 2 to 7 changing it to from 3-7 or 4-6 would not introduce new matter whether those new ranges were specifically disclosed in the specification or not because of this explanation of the meaning of a disclosed broader range, such as 1-10. This meaning of a range is in keeping with the requirement in 35 USC 112 that the disclosure be concise.

Further, when the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF THE DRAWINGS

FIG. 12 is a vertical cross-section of a another known KTEM showing a fluid cooled needle assembly for controlling the melt flow out of the melter and having a fluid-cooling can around each of the electrodes at the melt line.

FIG. 13 is a cross section of a typical known cooling can for the electrodes of a KTEM.

FIG. 16 is a vertical cross section of a refractory device for protecting the falling super hot melt stream until it enters a tank melter.

FIG. 17 is a partial plan view of a manipulating device for placing and removing the super hot melt stream protection device shown in FIG. 16.

FIG. 18 is a partial plan view of the manipulating device and the super hot melt stream protection device.

DETAILED DESCRIPTION AND BEST MODE

Figure 1:
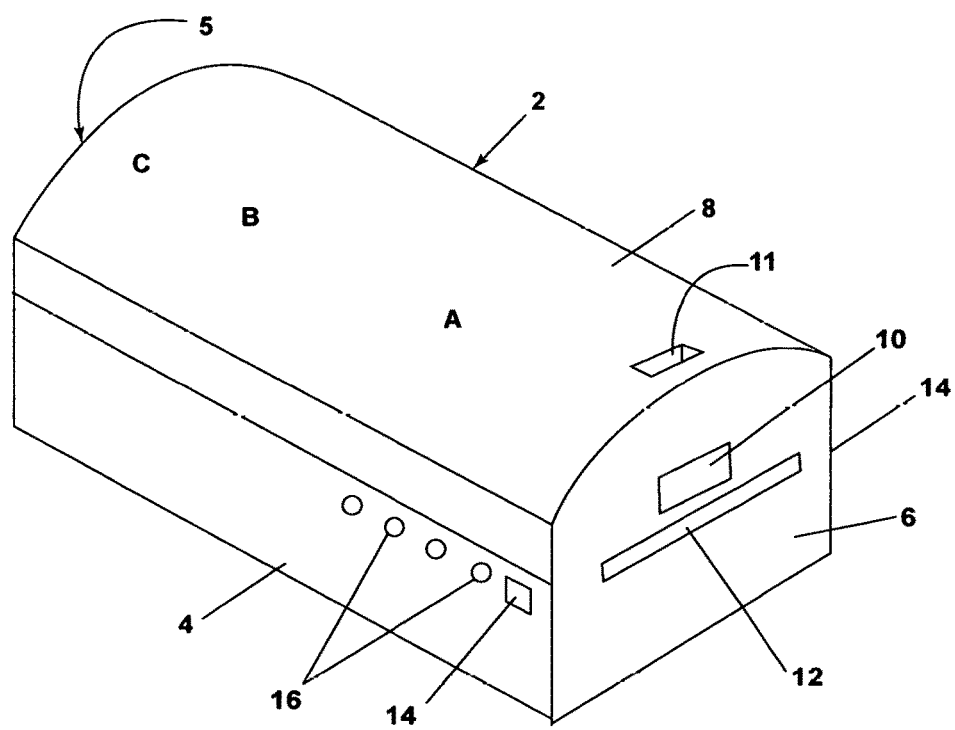
FIG. 1 is a perspective view of a typical known tank type glass melter.

The tank type melter shown in perspective in FIG. 1 is a typical tank type melter 2 that can be a gas/air fired, oxy/fuel fired, with or without electric boost and with using a plurality of side and/or bottom electrodes as is well known and with or without one or more bubblers. It can also be all electric with side electrodes and with or without bottom entry electrodes. These type of melters typically have a large footprint compared to KTEM and other HSM melters. Some typical tank type melters are shown in U.S. Pat. Nos. 4,812,372, 5,346,524, 6,101,847, 6,237,369, 6,398,547 and 7,475,569, the disclosures of which are hereby incorporated herein by reference. In these tank type melters, using the melter 2 of FIG. 1 as an example, the melter is usually longer than it is wide, with sidewalls 4, with optional batch entry openings 14, a discharge end wall 5 (not shown), a front end wall 6 with a batch entry opening 12 and an optional exhaust gases discharge opening 10, an arched or flat crown 8 with an exhaust gases opening 11. Each of the two sidewalls 4 has burners 16 (not shown) spaced apart down at least most of the length of the tank 2, the burners 16 being air/fuel and/or oxy-fuel, with or without preheat of one or both the air, the oxygen and/or the fuel and with or without boost electrodes in the melt coming through the sidewalls and/or the bottom of the tank 2. This is just one of many types of tank type melters that the systems and methods of the invention of boosting the melting capacity while keeping the quality of the melt discharged from the tank melter as good or better than before by applying the invention.

The tank 2 is considered to have zones down its length A, B and C. Zone A is the melting zone, including the batch input to the final melting of the batch cover floating on the melted glass bath. Zone B is the homogiinization zone where the temperature and the mellt composition is made more uniform and usually where a foam cover over the melt is greatly reduced or eliminated. Zone C is a refining zone where seeds, gas bubbles, are at least mostly removed, the melt is further homoginized and then discharged. It is desirable to have the highest temperature, the "hot spot", in the glass melt as close to the front end wall 6 as possible and near the center or towards the sidewalls 4, but due to the energy required to heat and melt the batch being fed into the tank 2 at the frint end, the "hot spot" is typically much farther downstream than desired and in the center portion of the width of the tank 2. Also, because of this the viscosity of the glass melt is higher than desired aggravating the formation of a foam cover over the melt bath that acts as an insulating layer that reduces high temperature radiation from flames above the melt line from the burners 16 from entering the melt at the rate desired. Most all types of tank type melters are suitable for application of the present invention of boosting systems and methods as will be apparent, given the present disclosure herein, to those skilled in the melting art. These types of tank melters include, but are not limited to those mentioned in the sections above.

Figure 2:
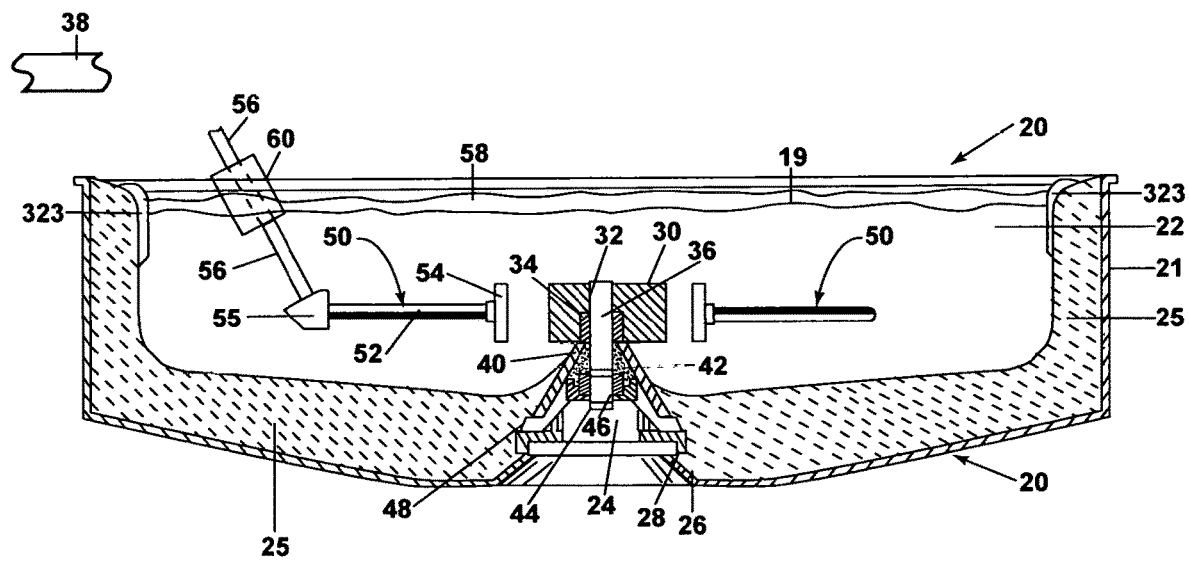
FIG. 2 is a vertical cross-section of a known HSM, a kettle type electric melter (KTEM) with overhead electrodes.

A very different type of melter, an HSM, a KTEM 20, is shown in vertical cross-section in FIG. 2. This KTEM 20 is a top entry electrode (TEE) melter disclosed fully in U.S. Pat. Nos. 3,912,488, 3,983,309, 4,143,232, 4,159,392, 4,796,276 and 4,862,477, the disclosures of which are hereby incorporated herein by reference. This KTEM 20 has a water cooled metal shell 21, usually double walled as known. Inside the water cooled metal shell 21 is a layer, lining 25 of appropriate refractory shapes, cast, sprayed or rammed material. Molten material 22, glass or any inorganic material having sufficiently high electrical resistance to cause it to reach the desired temperature with electrical currents, is contained with the refractory layer 25 and has a cover layer of unmelted batch 58. When melting materials at a temperature above 2000.degree F. an electrically conducting center block 30, having an outlet 32 therethrough and supported in the proper position by a refractory metallic pipe 36 and a refractory metallic cone 40, preferably both are made of a refractory metal like molybdenum, tungsten, or tantalum. A granular refractory material 42 surrounds the inside of cone 40, the lower portion end the metallic pipe 36 and a precious metal or alloy outlet orifice 46 that the metallic pipe 36 rests on. The metallic cone 40 and the orifice 46 are in turn supported by a water-cooled metallic lower cone 48, usually made of a high heat conductive material such as copper and supported in turn by the cone shaped shell bottom 26 with an intermediate stainless steel ring 28. A copper or other less thermally conductive refractory metal ring 44 surrounds a lower portion of the orifice 46. More details of other suitable outlets to discharge the melt are disclosed in U.S. Pat. Nos. 3,147,328, 3,376,373, 3,429,972, 3,580,976, 3,659,029, 3,912,488, 4,017,294, 4,146,375, 4,351,664, and 4,352,687, the disclosures of which are hereby incorporated herein by reference.

Horizontal primary electrode arms 38, usually three or more equally spaced apart around the KTEM 20 are each holding electrodes comprised of an electrode tip 54, usually in the form of a plate, each of which is threaded or welded to an electrode assembly 50, usually at the end of a lower electrode arm 52, with the other end of the electrode arm 52 connected in similar manner to a connector block 55 in turn attached to a vertical or angled electrode arm 56 that in turn is attached to the electrode arm 56 fluid cooled holder (not shown) on the end of the primary electrode arm 38 which is adjustable to control the space between the plate 54 and the center block 30, and rotatable to rotate the electrode 54 out of the melt 22. The primary electrode tip plate 54, the connector block 55 and the electrode arms 52 and 56 are made of a material having good electrical conductivity, preferably from a refractory metal like molybdenum, tungsten, tantalum, or alloys thereof. The electrode arms 38 are preferably copper and are connected by any suitable conventional clamping or bolting means. The upper portion of the upper electrode arms 56 are cooled internally along a portion of their length to prevent oxidation above the melt line 19 and in the close vicinity of the melt line 19, preferably by feeding cooling water to cooling cans 60 that are located above and below the melt line 19 and the batch layer 58 to prevent oxidation of the refractory metal electrode arms 56.

Figure 3:
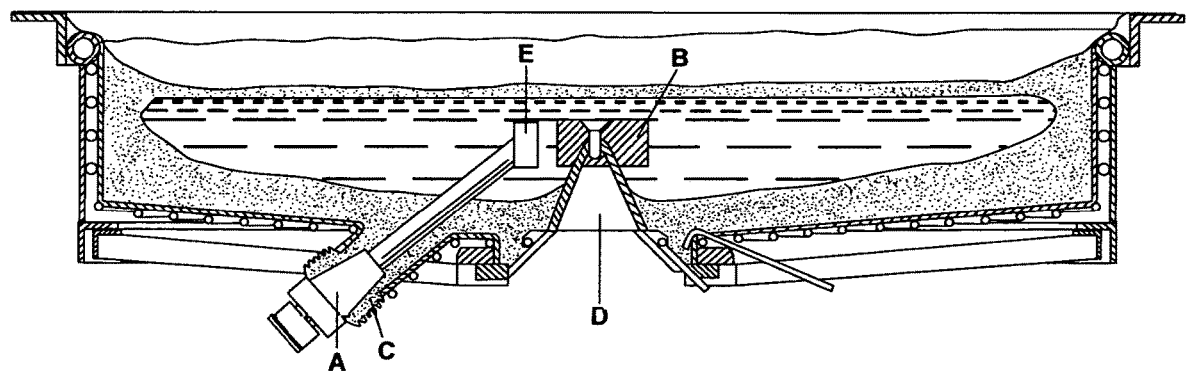
FIG. 3 is a vertical cross-section of a known HSM, a KTEM melter with bottom entry electrodes.

A still different KTEM having a double walled fluid cooled shell is shown in FIG. 3 in which the electrodes A, surrounded in the lower end with refractory material C enter the KTEM through its bottom, ending in electrode plates E facing a center block B which has an opening in the center for the melt to exit through the interior of a bottom cone D. This is an early version of a KTEM that, while not preferred, nevertheless can be used in the present invention. FIG. 3 shows a KTEM similar to that in FIG. 2 except in this type the electrodes enter the melt below the melt line passing through the cooled shell and the refractory lining and is typically called a bottom entry electrode KTEM. This type of melter is fully described in U.S. Pat. Nos. 3,580,976, 3,659,029, 3,876,817, 4,159,392 and 4,862,477, the disclosures of which are hereby incorporated herein by reference. Other types of KTEM's include side discharge kettle melters like those mentioned and described in U.S. Pat. Nos. 4,099, 949, 4,611,331, 4,351,054, 4,862,477, 5,961,686, 6,044,667, 6,178,777, 6,314,760 and 6,418,755, the disclosures of which are hereby incorporated herein by reference. Most any melter having a bottom or side discharge of super hot melt that has a temperature above 2400, preferably above 2425-2475 and most preferably at least as hot in the range of 2500 to 2600 degrees F. and being of a size suitable for supporting high enough for the discharged melt to drop onto the batch cover or foam cover floating on melt in the tank melter are suitable for use in the boosting systems and methods of the invention. For example, the melters described in U.S. Pat. Nos. 4,366,571, 4,414,232, 4,638,490, 4,796,276, 4,819, 247, 5,550,310, 5,573,564, 5,643,350, 6,983,006 and 7,108, 808, and the like, the disclosures of which are hereby incorporated herein by reference, can all be Hot Shot Melters (HSM) as well as some types of those known as Sorg melters or Sorg-type melters.

Figure 4:
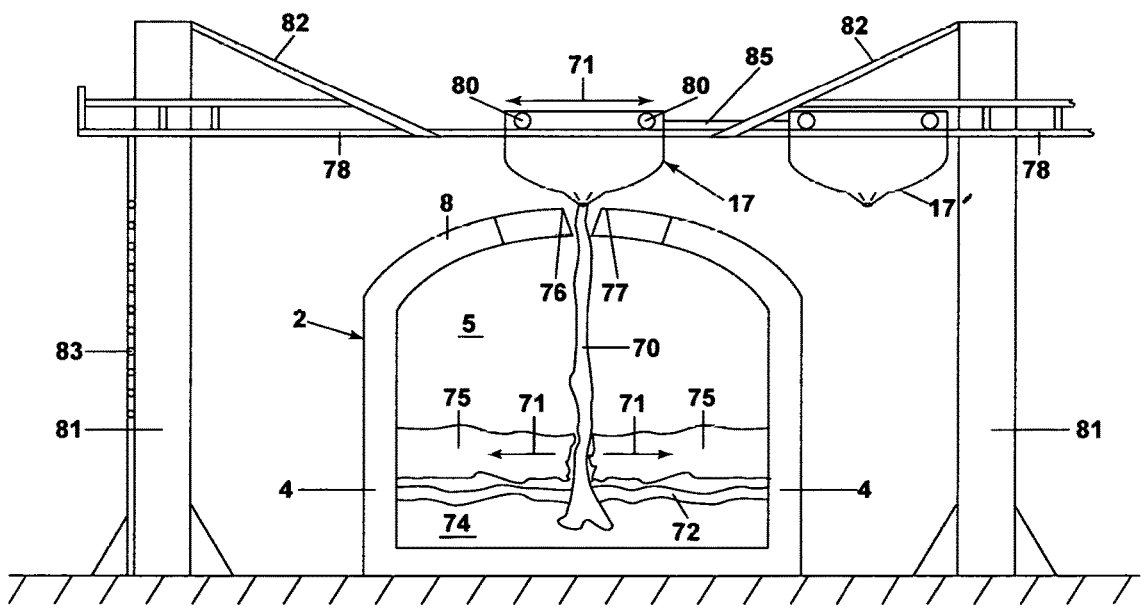
FIG. 4 is a vertical cross-section of a boost system for a tank melter with one or more HSM's, here a KTEM mounted above the crown of the tank melter and optionally also a standby HSM, here a KTEM melter adjacent to the tank according to the invention.

FIG. 4 is a vertical cross section of a tank melter 2, like that shown in FIG. 1 or other types, taken in the A or B zones, preferably in zone A as close to the batch feed end 6 as practical, and showing a KTEM 17 in front view, mounted on a platform 78 supported by two spaced apart vertical supports 81 with one vertical support 81 being adjacent each of the two sides 4 of the tank melter. The KTEM 17 is located, mounted, above the center of the crown 8 and is delivering a super hot melt stream 70 onto a batch cover layer 72 after passing through a hole 77 in the crown 8. The super hot melt stream 70 falls into the tank melter 2 dropping through hot flames 75 that come from burners in the side walls 4 of the tank and into or near a batch layer 72, or foam layer, and into the hot melt bath 74, spreading outward as it passes into the hot melt bath as indicated generally by the lines in the hot melt bath 74 below where the stream 70 enters.

Figure 5:
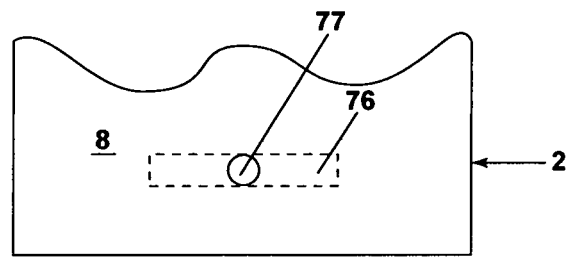
FIG. 5 is a partial plan view of a crown of the tank type melter shown in FIG. 1, modified according to the invention.

Optionally, but preferably, the KTEM 17 is mounted on wheels 80, or rod assemblies, like that used to mount movable electrode holders shown in U.S. Pat. No. 4,159, 392, already incorporated by reference, with bearings or other known equivalent devices for mounting and moving heavy things. The wheels 80 that allow the KTEM 17 to be moved back and forth in a straight line as shown by arrows 71, using other known assemblies, in an oval or circular pattern, or other desired pattern, to cause the super hot melt stream 70 to enter and influence a larger area of the batch layer 72, or foam layer, and melt bath 74 to enlarge the hot spot caused by the super hot stream 70. To accommodate the moving super hot stream 70 it is necessary to create a slot 76 in the crown as shown in FIGS. 4 and 5, the latter being a partial plan view of the tank melter crown 8 shown in FIG. 4, and showing either a hole 77 or a slot 76 in the crown 8 for the stream 70 to pass through. Also optionally, but preferably, a second KTEM 17' is located over the tank melter sidewall 4 or an adjacent area next to or near the tank melter 2, in ready condition to rapidly start up to quickly to replace the KTEM 17 when it needs to be withdrawn and/or shut down for repair and/or rebuild. Platforms on the horizontal support beams 78 gained by a ladder(s) 83 or stairs (not shown) are of a size to allow access to one or both KtEM's 17, 17' for addressing the needs for their operation and maintenance. Various strengthening members 82 for the support beams 78 can be added as will be known to support the load of the KTEM and its auxilary equipment. Removable connecting member(s) 85 can link the KTEM's 17 and 17' when KTEM 17 is pulled out of operating position for rebuild to move KTEM 17' into operating position at the same time. The removable connecting member(s) 85 are disconnected once a KTEM 17 or 17' is in operating position and operating, and when it is desired to move the super hot stream 70 back and forth or in some pattern as described above.

Figure 6:
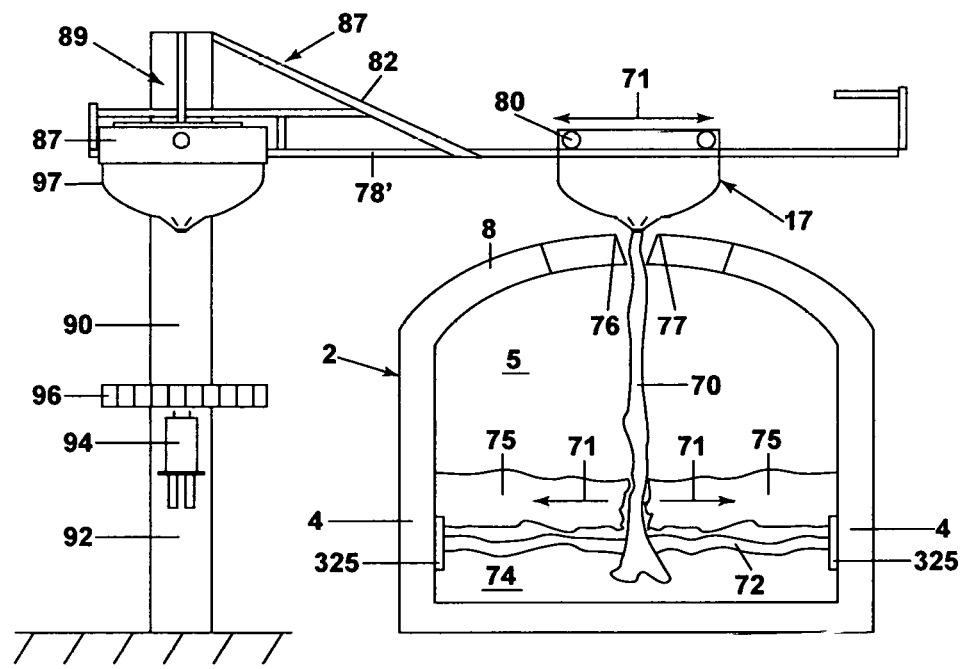
FIG. 6 is a front view of another embodiment of the invention in which an HSM melter or melters are mounted and moved into operating position differently with a cross section of the tank melter.

FIG. 6 shows another way of mounting a KTEM 17, or other HSM, above a tank melter and is similar to the embodiment shown in FIG. 4, but in this embodiment the melters 17 and 97 are moved into and out of operating position in a different manner. FIG. 6 is a front view of an assembly for supporting two HSM melters next to a tank melter 2 shown in vertical cross section, like that shown in FIG. 1 or other types, the cross section located in the A or B zones, preferably in zone A as close to the batch feed end 6 as practical, looking towards the downstream end 5 of the tank 2. FIG. 6 shows a KTEM 17, supported by an HSM supporting system 87. The KTEM 17 is mounted on an end portion of an arm, platform 78' above the center of the crown 8 and delivering a super hot melt stream 70 through a hole 77 in the crown 8 into the tank melter 2, dropping through hot flames 75 coming from burners in the side walls 4 of the tank, and onto or near the batch layer 72, or foam layer just above, and into the hot melt bath 74. The super hot melt stream 70 spreads outward as it penetrates into the hot melt bath as indicated by the lines in the hot melt bath 74 below where the stream 70 enters the melt bath 74.

The arm, platform 78' is further supported by one or more braces 82' connected on the other end to a vertical, tubular support 89 in a known manner. Preferably, a vertical, tubular support 89, optionally but preferably, is in two parts, an upper part 90 and a lower part 92. The upper part 90 is rotatably connected to the lower part 92 in a known manner and is mechanically rotated in any suitable manner such as with a reversible electric gear motor 94 mounted on the outer surface of the lower part 92 and having a gear mounted on its shaft that meshes with a large ring gear 96 fixed to the outer surface of the upper part 90. Thus when the reversible gear motor 94 is energized it can preferably move a preferably preheated second KTEM 97, mounted on an end portion of a second arm, platform 87, spaced about 90 degrees from the arm 78', into operating position as it, at the same time, moves the hot KTEM 17 out of operating position and into a position for repair and/or rebuild. Also, like the optional feature of the system shown in FIG. 4, the KTEM or other HSM melters can be moved back and forth as shown by arrows 71, or in another pattern as described above. If desired, it is within the skill of the art, given the disclosure herein, to add counter weight(s) on the vertical support 89 to counter balance the arms 78' and 87.

It is also a part of the invention to mount two, three, four or more KTEM's or other HSM's above a tank melter to further boost the capacity and output of molten material of suitable quality and/or to improve the quality of the exiting melt. This can be done using any combination of mountings (ones shown or other known support bridges, or cantilevered systems, devices for moving the super hot melt stream(s) melter or stream moving back and forth, oval, circular, etc. and moving in and out of operating position. FIGS. 7-10, partial top views of the tank 2 showing openings in the crown 8 for a different arrangements of HSM's super hot melt streams from two to four KTEM's and/or other HSM melters mounted above the crown 8 with openings 100, 101, 105, 106, 107, 111, 112, 113, 117, 118, 119 and 120 being holes through the crown 8 and openings or slots 102, 103, 104, 108, 109, 110, 114, 115, 116, 121, 122, 123, and 124 being slots or elongated openings through the crown 8 to enhance the size of the "hot spot" or "hot spots" in the area where the super hot melt streams enter the melt bath 74 in the tank melter 2.

Figure 7:
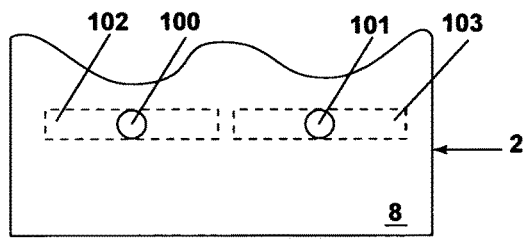
FIGS. 7-10 are plan views of the different crowns of tank melters when using 2, 3, or 4 HSM melters to boost tank melters.
Figure 8:
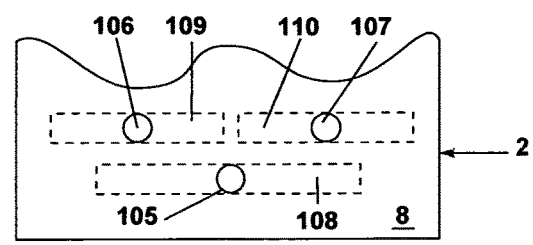
Figure 9:
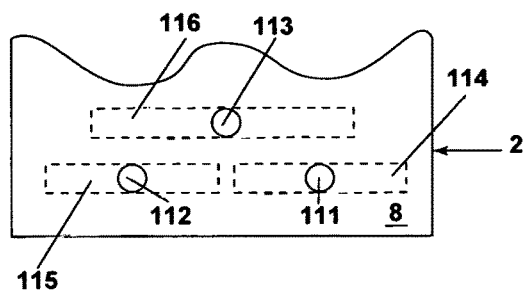
Figure 10:
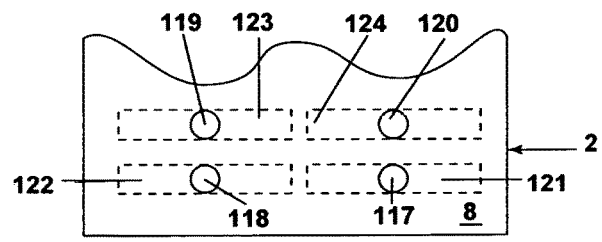

For example, a modification of FIG. 6 would add a second HSM support system 87 on the other side of the tank melter 2 and then two HSMs, like two KTEM melters would not drop their streams above the cenerline of the crown 8, but instead could drop their streams through holes 100, 101 or slots 102, 103 as shown in FIG. 7 showing openings for two super hot melt streams from two KTEM and/or other HSM melters mounted above the crown 8. FIG. 8, a partial top view of the tank 2 showing openings for three super hot melt streams from three KTEM's and/or other HSM melters, mounted above the crown 8 with openings 105, 106,107 being holes through the crown 8 and openings 108, 109, 110 being slots openings through the crown 8. FIG. 9, a partial top view of the tank 2 showing openings for a different arrangement of three super hot melt streams from three KTEM and/or other HSM melters mounted above the crown 8 with openings 111, 112,113 being holes through the crown 8 and openings 114, 115, 116 being slots openings through the crown 8. FIG. 10, a partial top view of the Tank 2 showing openings for an arrangement of four super hot melt streams from four KTEM and/or other HSM melters mounted above the crown 8 with openings 117, 118,119, 120 being holes through the crown 8 and openings 121, 122, 123, 124 being slots openings through the crown 8.

The manner of forming the platform 78 and spaced apart vertical supports 81 in FIG. 4 above and the other types of supports and movable supports for supporting and moving HSM melters described in the previous several paragraphs is within the known skill of the art of supporting heavy equipment using steel beams, channels, angles, etc. to provide the proper and practical systems for the HSM melters used and the scemes of moving, manipulating and replacing in an efficient and rapid manner.

The above systems preferably also comprise one or more devices for protecting the falling super hot melt stream(s) as they freefall from the HSM melters through the hole(s) 77 in the tank melter crown 8, and also to prevent all or most all hot gases from escaping from the hole(s) 77 in the crown 8. As shown in FIG. 16 refractory enclosures can be used to protect the super hot melt stream 70 from air currents in the area and from loosing much heat and temperature between the HSM exit and the entry into the tank melter. The preferred device for accomplishing this is an amorphous silica tubular enclosure 270, most preferably a tube shape in one, two or more segments 272, 274. The amorphous or fused silica tube 282, or other enclosure, can be further insulated and sealed at each end with one or more layers of a mat or blanket, also in two or more segments 276, 278. The mat or blanket 276,278 can be any appropriate refractory insulating material and preferably is made of amorphous silica fibers such as the amorphous silica fibers available from the Johns Manville Corporation located in Denver, Colo., or silica insulating refractory. These amorphous silica fibers were used, among other things, to make the insulating blocks that protected the United States space shuttles upon their reentry into the atmosphere surrounding the Earth. This assembly can be supported by a refractory stainless steel, or other heat and oxidation resistant metal enclosure 280 having a supporting bottom ledge 285 and a top containing ledge 286 and is preferably in two parts that hinge together so that it can be installed in a open configuration (see FIG. 17) and then closed around the super hot melt stream 70 once in the proper position. Spaced apart tabs like 297 extend outward horizontally and perpendicularly from the outer surface of the metal enclosure 280 for lifting, opening and closing of the assembly 270. Another layer or gasket of compressible refractory insulation 283 is adhered on the top surface of the top containing ledge 286 and another layer of the same or different insulating material is adhered on on the bottom surface of the supporting ledge 285 to seal any gap between the bottom of the HSM and the top of the crown 8 to prevent excessive amounts of hot gases from escaping through the opening in the crown 8 due to the gas pressure inside the tank melter.

When compressed between or around the ends of the fused silica enclosure, one end against or very near the bottom or the melt outlet of an HSM melter and the other end against the crown 8 around the hole 77 seals are produced protecting the super hot melt stream and the hole 77 from escaping hot gases from the tank 2. Amorphous silica is preferred because its coefficient of thermal expansion is very low and its melting point and service temperature range extends higher than the temperature of most melt streams and its interior surface can withstand a melt stream a reasonable distance from the interior of the fused silica tube even though the temperature of the melt stream may be one or more hundreds of degrees higher than the melting point of amorphous silica. Instead of fused silica, the interior refractory can be fused cast or otherwise produced glass contact refractory of known types, mullite, high alumina, etc., i.e. any material that will resist the high temperature and not deteriorate, fall into the tank melter and contaminate the glass melt while in place for months between HSM furnace repairs or rebuilds.

FIG. 17 shows one manipulating device 290, of many possible known manipulating devices available, and an arrangement for positioning the melt stream protection device, tube assembly 270, 275 in place around the falling super hot melt stream, or where it will fall, and for removing the protection assembly 270, 275, while the super hot melt stream is falling or after it has been shut off. The manipulating device 290 is comprised of a handle member 300 having a slot 304 in an end portion and near a short arm 303 extending from an end of the handle 300 and attached to a hinge 299. Extending from the hinge 299 are two curved and movable supports 291 and 292 that open and close to come around the metal container 280 of the super hot melt protective assembly 275 with the aid of a tab 293 attached to the outer surface of each of the movable supports 291, 292, and moving members. The moving members are comprised of links 294 and 295, each attached at one end to either of the tabs 293 and at the other end of a pin 296 in a rotatable manner, the pin 296 residing in the slot 304. Also attached to the pin 296 is a rod 301 that can be moved parallel to the supporting arm 300 to cause the pin 296 to move back and forth in the slot 304 which will in turn cause the curved supports 291 and 292 to open and close opening and closing the super hot melt protective assembly 275 to open and close. To move the assembly 270, 275 the rod 301 is pulled back in the slot 304 to open the supports 291,292 and the handle member 300 is moved to position the supports 291,292 below the tabs 298, 297 on the protective assembly 275 (see FIG. 18). The tabs 297, 298 have a pin 302 extending downward that passes into holes in the supports 291, 292 when the supports 291, 292 are raised by the handle member 300 so the protective assembly 270, 275 can be opened without slipping off of the tabs 298, 297. After the protective assembly 270, 275 is placed around the hole in the crown 8 and closed, and if it is desired to remove the manipulating device 290 from the protective assembly 275, then the handle member 300 is lowered to clear the supports from the pins 302 in the tabs 298, the rod 301 is moved forward to move the pin 296 forward in the slot 304 to open the supports 291, 292 and the handle member is moved to withdraw the manipulating assembly 290 to a desired storage location further away from the crown 8 and/or the protective assembly 275.

This device 290, or obvious modifications thereof, can be used on other configurations of super hot melt stream protective devices. Also, the HSM melters can be supported such that the bottom or melt stream exit is so near the top of the crown 8 of the tank type melter that any gap can be contained with a simple compressible washer like refractory gasket. It is also within the scope of the invention and within the ordinary skill of the art to install and implement mechanical and/or hydraulic jacks to raise and lower the HSM melter to facilitate sealing of the ends of the super hot melt stream protective device to prevent totally or practically the escape of hot gases from the tank melter through the hole(s) in the crown for the super hot melt stream(s) to fall into the tank melter.

Figure 11:
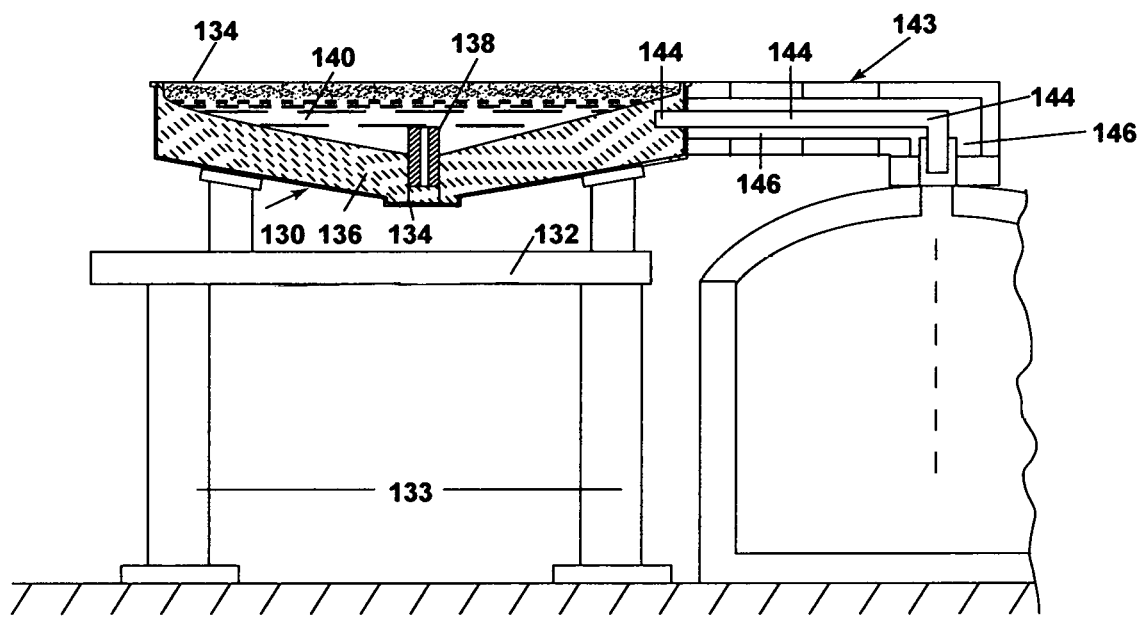
FIG. 11 is a vertical cross section view of a side delivery KTEM mounted beside a side wall of a tank melter with a melt transport assembly connected to the KTEM.

When one or more side delivery KTEM and/or other HSM melters are used, it isn't necessary to mount the one or more HSM melters out over the crown 8 of rthe tank melter 2, but instead can be mounted at the sides of the tank, preferably in either zone A or Zone B. As shown in FIG. 11, a vertical cross section of any tank melter and any HSM melter, e.g. like the any of the side discharge KTEM melters, in zone A or zone B, preferably in Zone A as close to the batch feed end as practical. The side discharge melter can be like the one shown in U.S. Pat. Nos. 5,961,686 and 6,044, 667, the disclosure of which is hereby incorporated herein by reference This KTEM 130 Is mounted on an elevated platform 132 supported by supports 133. The KTEM melter 130, like those described above, has a water cooled metal shell 134, a refractory lining 136 and a refractory metal center block 138. The electrodes are not shown, but can be of the types and in any arrangement shown in the KTEM patents incorporated by reference above. The melter 130 is shown filled with melt 140 covered with a batch layer on top of the melt 140.

The super hot molten material, usually glass, is transported above the crown 8 of the tank 2 with an insulated assembly 143. A refractory metal pipe or box channel (pipe) 144, located in the interior of the insulated assembly 143, enters the KTEM melter 130, protruding into the melt 140 through a hole in the shell 134 and the refractory lining 136 with a refractory surround in the vicinity of the shell 134 to prevent shorting and reaction between the refractory metal pipe 144 and the fluid cooled metal shell 134. A viscous melt 146, having a melting point lower than the melt 140, in the KTEM and in the pipe 144 that protects the refractory metal pipe 144 from oxidizing. Refractory, resistant to the viscous melt 146, surrounds and contains the viscous melt 146. The refractory metal pipe 144 can be heated by its own resistence to an electrical current in a known manner to start and to prevent significant lowering of the temperature of the super hot melt it is transporting to an opening in the crown 8 of the tank 2 as earlier described. The insulated assembly 143 can be constructed as disclosed in U.S. Pat. Nos. 4,029,887, 5,961,686, 6,227,007, 7,007,515 and U; S. Pub. App. No. 20100126223 other similar constructions aa well as known forehearth constructions including that disclosed in U. S. Pub. App. 20140013806, the disclosures of the patents and published patent applications mentioned earlier in this sentence hereby incorporated herein by reference.

The invention also includes systems of other configurations of HSM melters located at the side or sides of tank melters and elevated to deliver super hot melt stream(s) to other locations of holes and/or slots in the crown as shown in FIGS. 7-10 by locating one or more additional HSM melters along the side(s) of the tank melter using the configuration shown in FIG. 11, and/or as shown in FIGS. 4 and 6 with description thereof above. The HSM melter shown in FIG. 11 and one or more of any additional HSM melters used with this system can be moved back and forth or in an oval or circular or other configuration as described above and shown earlier in other figures with additional wheels or rods, etc. mounted on a frame supporting the insulated melt delivery assembly or assemblies In a known manner. Also, the flow rate of the super hot melt can be controlled in any of the HSM melters with a movable needle or any of the other known devices and methods for controlling the rate of a melt including that disclosed in U.S. Pat. No. 4,600,426, the disclosure of which is incorporated herein by reference.

In any of the embodiments described above wherein the super hot melt stream(s) are moved in any pattern this has been accomplished by moving the HSM melter(s), and in some cases also the super hot melt transporter assembly, but this can also be accomplished in other ways such as by moving a diverter or delivery device, trough, separate diverter pipe of suitable shape or other known melt delivery devices in known manners, e.g. that intercepts the super hot molten stream and moves back and forth or around, at least at its discharge end to move the molten stream in the desired manner.

FIG. 12 is a vertical cross section of another typical KTEM melter including two different types of cooling and/or preheating for the shell/refractory lining according to the systems and methods of cooling of the invention. These two conventional cooling systems for the shell and refractory lining can also be used according to the invention to reduce the start-up time following a shut down or rebuild by preheating the shell and refractory lining from the exterior inward while the interior is being heated faster, without damaging the refractory lining, to obtain a molten bath inside the KTEM, HSM melter 150. The melter 150 has a steel or stainless steel or other metal shell 152 having a bottom section 153, a refractory metal cone 155 supporting a center block 162, a refractory lining 154 containing a melt bath 156 with a melt line 157 and a batch cover layer 158, The first cooling and/or preheating system for the shell 152 is shown on the left side where copper or other high thermal conductivity tubing 160 spaced apart closely against the sides of the shell 152 and the shell bottom section 153 removes heat or adds heat to the shell and the shell bottom section 153. A different cooling and/or preheating system is shown on the right side of the KTEM 150 in which cooled or heated fluid is sprayed onto the shell 152 and the shell bottom section 153 using a plurality of spray heads 164 with the fluid striking the shell removing or adding heat and then falling into a catch pan 166 where it is returned to a heat exchanger for cooling or to a heater for reheating via a return pipe 167, these to be shown in a later figure.

This KTEM of FIG. 12 has cooled electrodes 170 supported moveably by the horizontal electrode arms 38. These electrodes are described in several U.S. patents including U.S. Pat. Nos. 3,983,309 and 4,159,392, the disclosures of which is incorporated herein by reference. The electrodes 170 comprise an upper vertical or angled electrode arm 172 cooled internally by a cooling fluid entering through an inlet pipe 174 and exiting through an exit pipe 175. The upper electrode arm 172 is further cooled above, at and below the melt line 157 with a fluid cooled surrounding cooling cannister 176 having an inlet pipe 177 (see FIG. 13 for further details). A lower electrode arm 179 connected to the upper electrode arm 172 with an knuckle 171 and has an electrode plate 180 at its other end that is spaced from the center block 162. The center block 162 has a vertical or near vertical melt discharge channel down its center for discharging the melt out of the KTEM 150 (see FIGS. 2 and 14 and the disclosures in U.S. Pat. Nos. 3,983,309, 4,159,392, 4,142,880 and 4,796,276, all previously incorporated in their entirety by reference herein, for details). The rate of discharge is controlled by a vertically movable needle assembly 181 with a tapered needle 182 at its lower end that enters the channel 32 in the center block 162 to reduce and control the rate of melt discharge and to stop discharge when desired. The needle is internally cooled through much of its length by introducing a cooling fluid into its hollow portion through a tube (not shown) that exits after cooling through an exit tube 184. The needle 182 is further cooled at and near the melt line 157 with a surrounding cooling cannister 186 that is flooded with a cooling fluid coming through an inlet tube 187 that after circulating through the cannister 186 exits through an exit tube 188.

The invention also includes systems and methods for using high temperature heat transfer fluids to cool the HSM melters of all types where water, or cool air, was used in the prior art, and also to cool electrode holders, electrodes and bubbler assemblies used in melting materials at temperatures above 700, 800, 900 or 1,000 degrees F. Most any fluid or liquid suspension having a boiling point above about 250 or 275 degrees F. or preferably above about 325 degrees F. and much higher, at atmospheric pressure, can be used providing the dynamic viscosity is suitable to be pumped, the heat capacity exceeds about 0.3 BTU per pound, degree F. and the thermal conductivity exceeds about 0.03 or 0.04 BTU/hour, foot, deg. F. in the cooling range temperatures between the entrance temperature into the melter or KTEM, other components and the exit temperature from these melters and melter components. It is sometimes permissible and an option to run the cooling fluid exiting one component into another component before returning the hot exiting cooling fluid to and through a heat exchanger to remove heat with air, another gas, water, to cool down the cooling liquid. Typically the cooling liquids used in the invention are high temperature resistant oils, including products having the name Radco synthetic thermal fluids and "Hot Oil" Heat transfer fluids, DuraTherm™ high temperature capability extended life fluids including DuraTherm™ 600, 630 and S, Paratherm™ high temperature capability fluids including NF, HE, OR, EXCELTHERM®, heat transfer fluids including MK1, LV1, HT, XT, HTR, 500, 315, 600, 445FP, Radco's XCELTHERM® 600, XCELTHERM® LV1, MK1, XT, various DOWTHERM™ fluids and other like or similar heat transfer fluids, liquids, oils, and other melted or liquid materials. The high temperature capability cooling fluids used in the systems and methods of the invention include liquids, gases, particularly high pressure, high density gases and gaseous or liquid suspensions of particles of high heat capacity materials, e.g. metal particles, ceramic particles and mineral particles having a heat capacity exceeding 0.5 BTU per pound, degree F.

When the terms "cooled high temperature capability fluid", "cooled high temperature capability liquid", "cooled high temperature capability liquid suspension", cooled high temperature capability gas" or "cooled high temperature capability gas suspension" are used herein to describe the cooling or preheating media used for cooling or preheating the melter shell or any other part of the melter in the invention, what is meant is having a lower temperature than the temperature these cooling media have upon exiting the shell, cooling can, cooling jacket or assembly having at least a 25 degrees F., typically more than 25 degrees F. differential such as any temperature differential within the range of about 25-525 degrees F., e.g. a differential of 50, 100, 150, 200, 250, 300, 350, 400, 450, 500 degrees F., or any amount in between any of these amounts, especially a differential of more than 125, 150, 175, 200, 225 or 250 degrees F. The actual amount of temperature differential between the inflow of cooled high temperature capability fluid, etc., normally a high temperature capability liquid or liquid suspension, and the exiting hot high temperature fluid will vary with the actual desired temperature of the shell, cooling can, electrode jacket, bubbler jacket or other cooling device used in the invention in any particular high temperature (above 1,000 degrees F.) Inorganic material melter, of any type, operation.

The invention also includes systems and methods of removing high temperature heat energy, above at least about 225 degrees F. and as high as the temperatures described in the previous paragraphs, from the exiting hot high temperature capability gas, gas suspension, liquid or liquid suspension to prepare for entry back into the cooling systems of melters as described in the previous paragraph and further above including tank melters, HSM, KTEM, and other types. Because of the much more useful temperature of the high temperature cooling fluids, gas, suspensions, and/or liquids exiting the melters, electrode holders, bubblers, etc. or that of the liquid, suspensions, or gas used to cool the high temperature cooling fluids, these can be used directly or indirectly, according to the invention, for providing high heat energy to save energy by generating electricity, to dry and/or cure a vast range of products including fiber glass insulation products, fibrous nonwoven mats, chopped and continuous fiber mats and performs, preheating material or batch feed to the KTEM and other heating functions that require minimum temperatures anywhere in a range of from about 215-250 degrees F. up to higher temperatures up to 500 degrees F. or even higher up to 600 or 650 degrees F. including preheating any material including the material being melted or one or more ingredients of the material being melted.

The invention also includes systems and methods of using the high temperature fluid cooling and preheating system to preheat, or assist in heating up and/or drying out a refractory lining adjacent the metal shell HSM's to prepare them for start up and to avoid or reduce spalling or cracking of the refractory lining by hot melt when the interior of the HSM and batch is heated up to a melt so electrode heating can begin. One or more optional fluid heaters located outside the HSM can be used to heat the high temperature capability cooling/heating fluid to any desired elevated temperature up to its maximum safe use temperature prior to circulating the this hot fluid through the cooling structure of the metal shell to heat the refractory lining at the desired rate from the backside and to the desired temperature as the batch in the HSM is heated with burners, etc. in a known manner prior to hot melt contacting the interior of the refractory lining. At the appropriate time, temperature of the lining, or a combination of both, the system of the invention can then be switched to a circuit that bypasses the one or more fluid heaters and instead feeds the hot high temperature cooling fluid through one or more heat exchangers to remove heat from the high temperature capability cooling fluid prior to feeding the cooled high temperature capability fluid back to the one or more cooling systems for cooling the shell and other cooling systems on the HSM.

Further, because the high temperature cooling fluid coming into the one or more heat exchanger coolers in the systems of the invention are at substantially higher temperatures than previously experienced in prior art water cooling systems, such as up to about 630 degrees F. or even higher, the output of the heat exchanger used to cool the cooling fluid down prior to recirculation to the KTEM's shell has a much higher temperature compared to the air or water used to cool down the prior art KTEM's cooling water. Because of this much higher temperature the exiting heat exchanger fluid is much more useful to provide heat in other conventional processes nearby, such as air/water preheaters, dryers, annealing furnaces, and similar processes requiring hot air or steam at a temperature exceeding 250 degrees F. or even higher temperatures up to about 500-600 degrees F. Therefore, the systems of the invention optionally include systems and methods that exploit the higher temperature of the cooling fluid coming from the KTEMs to provide heat for these other conventional systems and processes, including using this heat to preheat the material, or a portion of the material being melted in the KTEMs. This is shown in FIG. 15 that, described below, is the part of the systems of the invention, including the known optional heat exchanger(s) that heat air, liquid or other gas hot enough to be useful in ovens, dryers, curing annealing ovens, heaters, etc.

The invention also includes systems and methods of cooling, using the high temperature cooling and/or preheating and/or heat transfer fluids as described above, electrodes, electrode holders, electrode cooling cans, needles or gates for controlling melt flow rate through an orifice or a channel, needle cooling cans, and/or orifices for removing molten material, including molybdenum electrodes and/or orifices, and precious metal electrodes and/or orifices and tin or tin compound electrodes that are normally water or air cooled. Such systems and methods of the invention apply to all types of melters in which such apparatus is/are used including tank type, HSM's including KTEM's, the other HSM melters described above and also any type of melter in which one or more electrodes, needles and/or bubblers are at least partially submerged in or spaced above a molten material in the melter and/or in which molten material flows through one or more metal or refractory orifices. The types of melters meeting this description includes all types of tank type melters, including those using electric boost comprising one or more electrodes for heating molten material in the tank melter. The invention also applies to electrode cooling, bubbler cooling and orifice cooling of refractory metals in contact with melts of glass and inorganic mineral materials. Bubblers and electrode holders frequently used in tank type melters are conventionally water cooled and this, due to the temperature limitations of water, also undesirably withdraws much heat from the lower portion of the melt bath that is a an undesirably low temperature anyway. Thus it is very desirable to not only portect the electrode holders and bubbler tubes, but to reduce the amount of heat withdrawn by the cooling of these devices. This is accomplished according to the invention by replacing the water with the high temperature cooling and preheating fluids descripted above. For further details on bubbler construction and use please see U.S. Pat. Nos. 4,600,425, 4,798,616, 5,188,649, 5,340,372, 6,334,337, 6,722,161, 6,912,874 and 7,225,643, the disclosures of which are incorporated herein by reference. For further details on electrode holder construction and use please see U.S. Pat. Nos. 4,897,853, 5,151,918, 5,471, 496 and 5,600,669, the disclosures of which are incorporated herein by reference.

Figure 15:
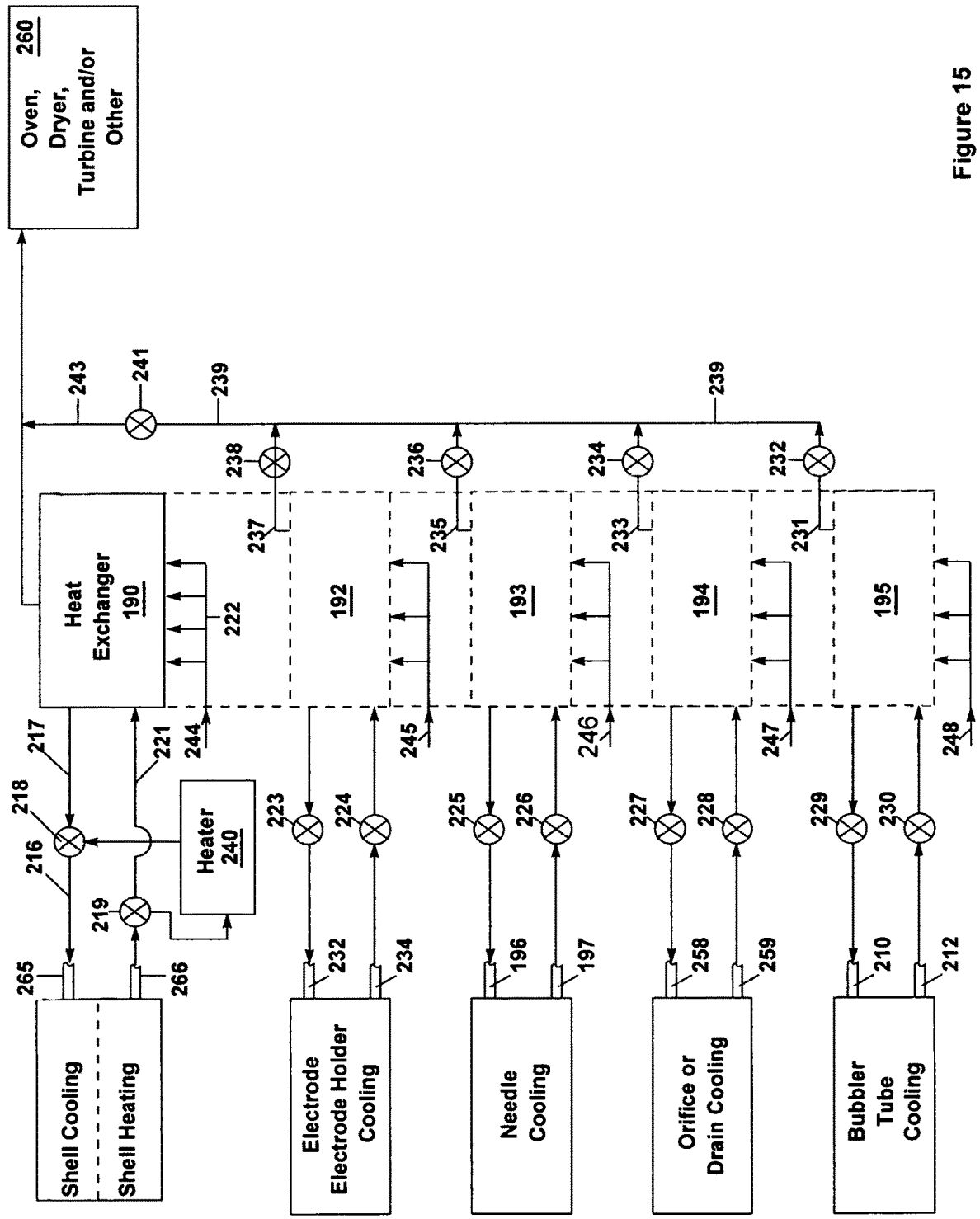
FIG. 15 is a schematic of the fluid cooling, and/or heating, systems of the invention.

FIG. 15 shows how the very hot cooling fluid coming from the HSM melters, electrode cooling systems, bubbler cooling systems, and the like is treated to remove the absorbed heat to prepare the cooling fluid for return to an HSM, an electrode holder, bubbler, etc. for protective cooling. The boxes on the left each represent the various devices that are being cooled, and/or heated, devices and functions previously described. FIG. 15 shows in schematic format typical high temperature fluid such as a melt, a liquid or a liquid suspension, a gas or a gaseous suspension cooling, and optional heating, schemes for removing, or adding, heat energy to or from the hot or warm cooling liquid or liquid suspension and for using the heat removed for producing hot air, or other gas, or steam for use in other operations or equipment in the plant or in the same operation, or for generating electricity with the removed heat energy including the use of steam produced with the removed heat energy in a turbine powered electricity generator. As shown in FIG. 15, the cooling of the hot high temperature fluid resulting from the cooling for a shell of a KTEM or other HSM melter, such as the shell 21 in FIG. 2, or shell 153 in FIG. 12, the cooling of the electrodes 56 and/or the electrode holders and/or the electrode cooling cannisters 60 or 176, the cooling of the needle jacket 181, and the cooling of the discharge orifice assembly 48 or drain assembly can be accomplished with a single heat exchanger 190 or one or more of the separate type of items to be cooled can be cooled in one or more of separate heat exchangers 192, 193, 194 and 195 respectively. When the latter arrangement is used, the heat energy removed from one or more of the separate heat exchangers 192, 193, 194, and 195 can, if desired be combined with the heat energy removed by the heat exchanger 190, or can be used or dumped separately if desired.

Separate heat exchangers might be desired when it is desired to run one or more of the shell cooling system, the electrode cooling system, the needle cooling system and the orifice or drain cooling system at significantly different temperatures. Since different kinds of metals and metal alloys are used in the KTEM and other HSM shells, the electrodes, the needles, and the orifices or drains, it can be desirable to operate one or more of these components at different temperatures from one or more of the other components to maximize or increase the life of the different components, and/or to maximize or increase the life of the refractory lining in the KTEM's and other HSM's. Also, operating different parts at different temperatures can increase the melter capacity and energy efficiency of the melter. In such instances one or more separate heat exchangers or heat exchanger sections will be needed as will be understood by those familiar with the art of the cooling and/or heating with heat exchangers. When wanting to put two or more of the exiting hot high temperature liquids or liquid suspensions coming through outflow pipes 210, 259, 197, 234 and 266 through the same heat exchanger 190, two or more of valves 219, 224, 226, 228 and 230 are positioned to direct the hot fluid, liquid or liquid suspension into the hot fluid, liquid or hot liquid suspension flow 221 through pipes (not shown) in a conventional manner, and two or more valves 218, 223, 225, 227, and 229 are positioned to direct the cooled fluid, liquid or liquid suspension into the cooled fluid, liquid or cooled liquid suspension flow 217 and into one or more of the inflow pipes 265, 232, 196, 258 and/or 210 through pipes (not shown) in a conventional manner. When it is desired to use one or more of the heat exchangers 192, 193, 194 and 1195, one or more of the valves 224, 226, 228 and 230 are positioned to direct the flow(s) of the hot liquid or hot liquid suspension into the appropriate heat exchanger and one or more of the valves 223, 225, 227 and 229 are positioned to direct the cooled liquid or liquid suspension into one or more of the inflow pipes 232 196, 258, and 210. The cooling for the shell of a KTEM melter, such as shell 21 in FIG. 2, or shell 134 in FIG. 11 can be cooled with an inflow of cooled high temperature fluid, liquid or high temperature liquid suspension through any of the cooling systems 24, 60, 48, 175 or 187 ect. in the figures. When cooling components of a tank type melter such as electrode holders and bubbler assemblies, either a single heat exchanger or separate heat exchangers can be used to cool the hot high temperature liquid or liquid suspension.

When any of the heat exchangers 190, 192, 193, 194 and/or 195 are used to cool high temperature cooling fluids having a use temperature of up to 600 degrees F. or higher, the air or other fluid 222, 245, 246, 247 and 248 used to remove the heat contained In the high temperature cooling fluids, this air or other fluid will have a much higher temperature than in the prior art HSM or other KTEM cooling systems that used water to cool. This higher temperature air or other fluid coming from the heat exchangers via valves 232, 234, 236 and 238 passing through line 239, valve 241 and line 243 to other devices 260 and will thus usually be much more useful in providing heat in other systems 260 such as dryers, producing steam for steam turbines, curing ovens and other systems requiring temperatures above 225 degrees F. and this is another advantage of using high temperature cooling/heating fluids according to the invention and also new uses for the cooling mediums that cool such fluids.

When a fluid suspension such as a gaseous suspension or a liquid liquid suspension is mentioned what is meant is a gas or liquid having suspended therein fine particles having a higher heat capacity, and preferably also a higher coefficient of thermal conductivity than the gas has or liquid has in which the particles are suspended. By fine particles is meant at least minus 100 mesh (0.149 mm openings), preferably minus 200 mesh (0.074 mm) such as minus 325 mesh (0.044 mm) or minus 400 mesh (0.037 mm) or still finer. All mesh sizes are based on Tyler screen equivalents. The finer the particles, the easier they are to keep suspended in the cooling heating and/or cooling air or liquid and the faster they will absorb heat and give that heat up when desired. For example, powdered metals are now common and readily available. Examples of such powder includes copper, aluminum and other metals, and/or alloys and compounds having high heat capacity and good thermal conductivity.

When it is desired to preheat the shell of an HSM like a KTEM the systems shown in FIG. 15 can have a heater 240 that can heat the high temperature cooling/heating fluid to the desired temperature and with the aid of valves 219 and 216, can remove said fluid through outlet 266, direct it to the fluid heater 240 and on into inlet pipe 265 for the purpose of heating, along with interior burners in the known manner, to heat the refractory lining from both the front and back sides to enable it to be heated faster without damaging the refractory lining for added purpose of getting a cold KTEM or HSM into operating condition faster without damaging the refractory lining, something very important to reducing downtime and manufacturing costs in any operation and in avoiding or minimizing the melt flow rate in tank melters when the KTEM or other HSM is being used to boost their capacity. Any types of known heat exchangers for efficient transfer of heat, or heaters, can be used, particularly those having high rates of thermal transfer at the temperatures between 225 and 600-700 degrees F. or somewhat higher.

The invention also includes systems and methods of cooling electrodes, electrode cooling cans, the needle, the needle cooling can, and/or orifices for removing molten material, including molybdenum electrodes and/or orifices, and precious metal electrodes and/or orifices, normally water cooled, with a cooling fluid in cooling systems for the electrodes and/or orifices. Such systems and methods of the invention apply to KTEMs and also to any type of melter in which one or more electrodes are at least partially submerged in or spaced above a molten material in the melter and/or in which molten material flows through one or more metal or refractory orifices. The types of melters meeting this description includes all types of tank type melters, including those using electric boost comprising one or more electrodes for heating molten material in the tank melter. The invention also applies to electrode cooling, bubbler cooling and orifice cooling of refractory metals in contact with melts of glass and mineral materials.

The invention permits the exiting cooling fluid to be at temperatures above at least 300 degrees F., more typically above at least 350-550 degrees F. and actually at any temperature between about 300 degrees F. and 350 degrees F. or 400 degrees F. or 450 degrees F. or 500 degrees F. or 550 degrees F. or 575 degrees F. or 600 degrees F. or even higher up to about 630 degrees F. Any fluid having a boiling point above about 325 degrees F. or 350 degrees F. or any of these exit temperatures can be used providing the dynamic viscosity is suitable to be pumped, the heat capacity exceeds about 0.3 BTU per pound, degree F. and the thermal conductivity exceeds about 0.03 or 0.04 BTU/hour, foot, F. in the cooling range temperatures between the entrance temperature into the KTEM shell and the exit temperature. Typically the fluids used in the invention are high temperature resistant oils including DuraTherm™ extended life fluids including DuraTherm™ 600, 630 and S, Paratherm™ fluids including NF, HE, OR and others. The cooling fluids in the systems of the invention include liquids, gases, particularly high pressure, high density gases and gaseous or liquid suspensions of particles of high heat capacity materials, e.g. metal particles, ceramic particles and mineral particles.

The invention also includes cooling systems and methods of cooling that use high temperature fluid suspensions of high boiling point, above about 300 degrees F., liquids, or gases containing particles of a solid material in suspension. The solid material particles can be one or more of metals, ceramics, minerals and glassy or amorphous materials. Particles of copper, iron, steels, barite, and high heat capacity metal alloys are particularly useful in this invention. As the viscosity of the particle suspensions increase, vibration and higher pressure pumps including positive displacement pumps can be used to keep the cooling fluid suspensions moving through the cooling systems. The fluid suspensions include combinations of the high heat capacity material particles mentioned above and water or the heat resistant cooling liquids having boiling points above about 250 degrees F. and higher as described above or gases like air, helium, carbon dioxide, carbon monoxide, argon, nitrogen and other gases. The particle size should be fine enough to allow the particles to remain easily in suspension, preferably at least minus 100 mesh when the cooling systems do not contain turbulence or static mixing features and more typically finer than minus 150 mesh, most typically substantially finer than 100 mesh including also minus 200, 325, and 400 mesh, minus 20, 15, 10, 5 or 2 microns and also including submicron material now called nanometer particles. The particles can be graded to prevent close packing to avoid re-suspension of settled material due to equipment malfunction or other quiescent times.

The invention also includes cooling systems for gas bubbler tubes used in glass melters for various purposes including to remove water, steam, gas bubbles, etc. and to prevent unmelted glass batch from moving beyond a desired location down the length of the melter. Such bubbler tubes have been water cooled in the past to protect the refractory metal tube used to direct the gas through the melter bottom or wall and into The molten glass.

Referring to FIG. 12, frequently the vertical electrode rods 172 are also internally water cooled down their length to below the melt line 157 with an inlet tube 174 and an exit tube 175, and also with cooling cans 176 having cooling fluid inlets 177 and heated cooling fluid outlets 178 to aid in keeping the electrode rods 172 above the melt line from oxidizing at an undesirable rate. The cooling cans 176 are shown in more detail in FIG. 13. The electrode assemblies 170 are supported and positioned with an electrode holder 38, only a portion of which is shown. Many different types of electrode holders are known and some that are particularly useful are disclosed in U.S. Pat. Nos. 4,159,392 and 4,862,477, the disclosures being incorporated herein by reference. Many different apparatus and methods of feeding batch onto the top surface 21 of melt 20 or batch cover 22 in the KTEM 2 are known, and one that is particularly useful is disclosed in U.S. Pat. No. 4,142,880, the disclosure being incorporated herein by reference.

Figure 14:
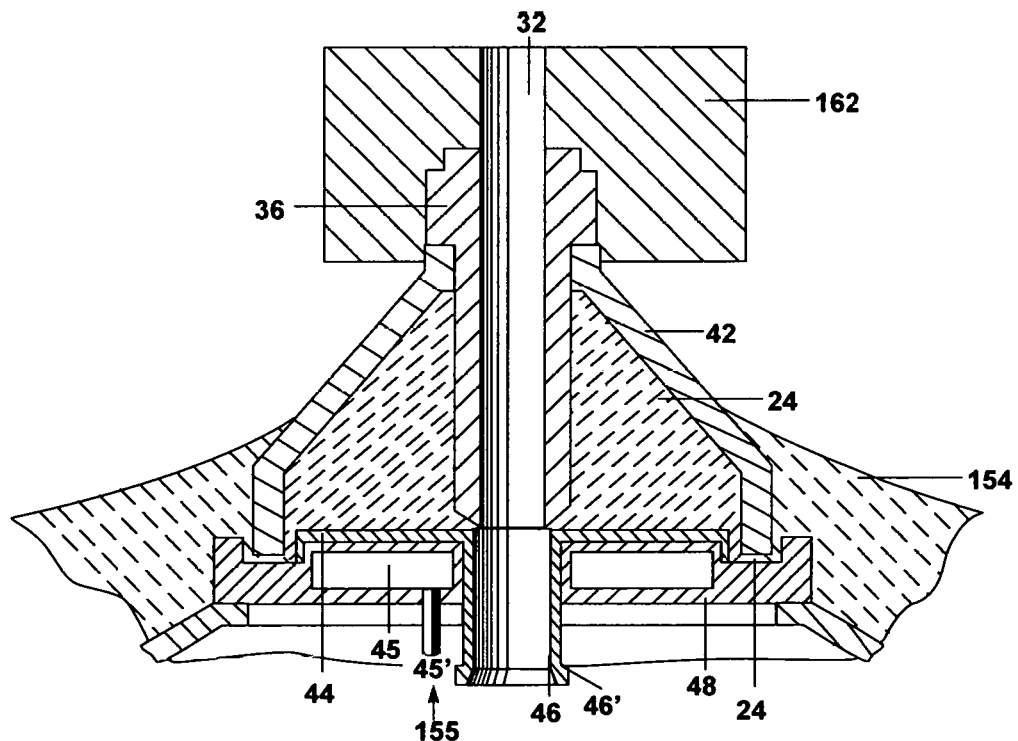
FIG. 14 is a cross-section of the center block and discharge outlet portion of the known KTEM shown in FIG. 12.

Typically, as disclosed in U.S. Pat. No. 3,659,029, incorporated herein by reference, and as shown in FIGS. 12 and 14 herein, the rate of flow of the hot melt from KTEMs through the bore 32 in the center block 162 in the orifice assembly shown in FIG. 14 is controlled with a needle assembly 181. A refractory metal needle 182 in a center region of the needle assembly 181, is raised and lowered with a conventional means (not shown) to increase and decrease or stop the flow of hot melt 156 through the orifice 32. The refractory metal needle 181 is protected from destructive oxidation by a liquid cooled can 186 surrounding that portion of the needle 181 that is above and below the melt line 157 and the batch or unmelted material layer 158. A cooling liquid is fed into the can 186 through a refractory metal (stainless steel, etc.) tube 187 and the hot liquid is removed through a refractory metal tube 188 connected to a different location on the can 186, and optionally with a second refractory metal tube 184 attached to an upper portion of the can 186. In the past, water has been used to cool the can 186 and the needle 182. According to the invention, the cooling liquid fed to the can 186 through the refractory metal tube 187, and 184, is the high temperature cooling liquid or liquid suspension described herein having a boiling point above 250 degrees F. and as high as at least 650 degrees F., or any point between 250 degrees F. and at least 650 degrees F. The hot, high temperature cooling liquid or liquid suspension coming from the refractory metal tubes 188 and/or 178 is sent to any type of heat exchanger known to be capable of handling the temperature of the hot, high temperature cooling medium and reducing its temperature to a suitable temperature for the high temperature cooling liquid or liquid suspension to feed to the refractory metal tube 187 to cool the can 186 and the needle 182. The hot fluid or air coming from the heat exchanger can be used to reduce the fuel or energy requirement of other operations such as dryers, annealing ovens, material heaters, etc. The outlet assembly shown in FIG. 14 is usable on any of the KTEM type melters, but other known type of outlets are also suitable. For full details of the outlet assembly shown in FIG. 14, and a few other suitable outlets see U.S. Pat. No. 3,912,488 mentioned above.

The KTEM, in some versions like that shown in FIG. 2, sometimes referred to as a TEE melter for "top entry electrodes", will melt any type glass or relatively non-electrically conducting material. The higher the melting point of the glass or material, the higher will be the temperature of the melt in the KTEM and of the melt exiting one or more orifices or throats 36 in the KTEM. The temperature will almost always be hundreds of degrees F. above the melting point of the material, at least it will be with most materials and with any glass. This causes an undesirably high thermal gradient between the hot face of the refractory lining 25 and the water cooled shell 21. The water cooled, cold shell 21, also hinders heating up a new refractory lining 25 prior to starting melting in the KTEM. Other versions of KTEM's have an exit orifice or forehearth mounted on the side wall of the KTEM as shown in U.S. Pat. Nos. 5,961,686, 5,643,350 and other patents. This type of KTEM melter is included in the meaning of KTEM in this invention.

Any of the known systems for feeding particulate material, including glass batches, can be used to maintain a material cover 58 (known as a cold top) on the upper surface of melt 22 in the KTEM. One system for feeding a particulate material or glass batch into a trough having openings, usually adjustable, along its bottom and having a rotating auger or rotating dispersing device therein and moving the trough as a radial arm about the furnace center while agitating the material or batch material in the vicinity of the perforations to discharge batch through the openings and onto the entire upper surface of the melt, as disclosed in U.S. Pat. No. 4,142,880, the disclosure of which is incorporated herein. The radial movement of the trough can be automatically stopped after a predetermined number of revolutions or when a desired thickness of batch layer is deposited. The radial motion is started, most typically when the surface temperature of the material or batch cover exceeds a set point temperature as measured with one or more thermocouples or one or more IR temperature sensors. The rate of deposition and degree of dispersion of the material or batch material onto the "cold" top can be regulated by the speed of rotation of the trough, the size of the openings in its bottom, the magnitude of power fed to the electrodes in the KTEM or by any combination of these techniques. The rate of feed of material or batch material to the trough can be regulated by a level sensor in the trough, one or more load cells supporting one or both ends of the trough or by any other known means of sensing the amount of material in the trough.

FIGS. 4 and 6 include a partial cross section of a typical prior art tank type glass melter 2. This tank type melter typically has an arched crown 8, but the tank type melter can have a flat crown or no crown as disclosed in U.S. Pat. No. 4,819,247, or a high crown as disclosed in U.S. Pat. No. 4,029,489, the disclosures of these patents being incorporated herein by reference. One or more electrically powered electrode assembly, usually spaced apart in the walls of electric tank type melters, are typically used as either the sole or a partial source, or boost, of heat energy to melt glass batch and to condition the molten glass. Conventionally, each electrode assembly comprises a molybdenum electrode that extends through the refractory walls and are surrounded along a portion of a length of each electrode in the wall and exterior of the wall by known cooled electrode holders containing an inflow pipe of flowing cooling water, and an outflow pipe carrying exiting hot water. According to the invention, a high temperature cooling liquid or liquid suspension of the type described above is fed into the inlet pipes to cool the electrode holders and that part of the electrode in the walls and hot liquid or liquid suspension exits the electrode holders through the outflow pipes and is cooled in a heat exchanger, see FIG. 15 and further description below. The invention allows each electrode assembly to operate in its intended manner while removing much less heat energy from the electrode(s) and wall(s), or the bottom of the tank, to reduce the electrical energy/ton of glass melt produced or to increase the capacity of the tank melter in tons/day of molten glass, or in any type of melter.

The bottom of some known tank melters also typically contain one or more conventional bubbler assemblies, normally spaced apart in one or more rows in the refractory bottom. The bubblers as known are typically used to condition the molten glass and/or to prevent foam and/or unmelted glass batch from progressing past a desired location along the length of the tank type melter and/or to gather and remove undesirables in the molten glass, such as steam bubbles, etc. As is known, gas bubbles created by air or another gas exiting from each bubbler tube into the molten glass and rising through the molten glass gathers bubbles or seeds, steam bubbles and other undesirable things in the molten glass resulting from gases emitted by one or more batch materials, etc. as is well known, and also mixes the molten glass to improve its homogeneity. As the gas bubbles reach the surface they create a barrier to foam and any unmelted batch floating on the surface of the molten glass and holding it from progressing further down the length of the tank type melter. Typically, the conventional bubbler assemblies comprise the bubbler tube extending from a location below the bottom and through a hole in the bottom to, or near, a top surface of the bottom.

Each known bubbler tube is cooled along a portion of its length in the tank bottom with a hollow cooling jacket to protect the bubbler tube and to freeze any molten glass to prevent molten glass leaks. Conventionally, cooling water is fed into the hollow cooling jacket through an inflow pipe or tubing and hot water exits the cooling jacket through an exit pipe or tubing. According to the invention, the high temperature cooling liquid or liquid suspension as described above is fed into the inflow pipe or tubing and hot high temperature liquid or liquid suspension is withdrawn through the exit pipe or tube. This invention removes less heat energy from the molten glass and the tank bottom allowing the bottom to operate at a higher temperature and requiring less heat energy input to the molten glass, thus significantly reducing the amount of fuel or electrical power needed to produce each ton of molten glass, or in the alternative, increasing the capacity (tons/day) of the tank type melter, or any type of melter. When the cooling systems of the invention are used in both the electrode holder assemblies and bubbler assemblies, the reduction of fuel usage or electrical requirements per ton of glass produced is reduced further and/or the capacity of the melter is further increased.

FIG. 15 shows in schematic format typical high temperature liquid or liquid suspension cooling, and optional heating, schemes for removing heat energy from hot cooling liquid or hot liquid suspension and for using the heat removed to producing hot air, or other gas, or steam for use in other operations or equipment in the plant or in the same operation, or for generating electricity with the removed heat energy including the use of steam produced with the removed heat energy in a turbine powered electricity generator. As shown in FIG. 6, the cooling of the hot high temperature liquid or liquid suspension resulting from the cooling for a shell of a KTEM melter, such as shell 21 in FIG. 2, or shell 153 in FIG. 12, the cooling of the electrodes 170 and/or the electrode holders 172, 38 and/or the electrode cans 176, the cooling of the needle jacket 186, and the cooling of the orifice assembly of FIG. 14, or drain assembly of FIG. 3 can be accomplished with a single heat exchanger 194 or one or more of the separate type of items to be cooled can be cooled in one or more of separate heat exchangers 190, 192, 193 and 194 respectively. When the latter arrangement is used, the heat energy removed from one or more of the separate heat exchangers 192, 193, 194 and 195 can, if desired be combined with the heat energy removed by the heat exchanger 100, or can be used or dumped separately if desired.

Separate heat exchangers might be desired when it is desired to run one or more of the shell cooling system, the electrode cooling system, the needle cooling system and the orifice or drain cooling system at significantly different temperatures. Since different kinds of metals and metal alloys are used in the KTEM shells, the electrodes, the needles, and the orifices or drains, it can be desirable to operate one or more of these components at different temperatures from one or more of the other components to maximize or increase the life of the different components, and/or to maximize or increase the life of the refractory lining in the KTEM's. In such instances one or more separate heat exchangers or heat exchanger sections will be needed as will be understood by the heat exchanger art.

When wanting to put two or more of the exiting hot high temperature liquids or liquid suspensions coming througth outflow pipes 66, 34, 11, 11A, 59 and 112 through the same heat exchanger 190, two or more of valves 119, 124, 126, 128 and 130 are positioned to direct the hot liquid or liquid suspension into the hot liquid or hot liquid suspension flow 221 through pipes (not shown) in a conventional manner, and two or more valves 118, 123, 125, 127, and 129 are positioned to direct the cooled liquid or liquid suspension into the cooled liquid or hot liquid suspension flow 217 and into one or more of the inflow pipes 32, 9, 58 and/or 110 through pipes (not shown) in a conventional manner. When it is desired to use one or more of the heat exchangers 152, 154, 156 and 158, one or more of the valves 124, 126, 128 and 130 are positioned to direct the flow(s) of the hot liquid or hot liquid suspension into the appropriate heat exchanger and one or more of the valves 123, 125, 127 and 129 are positioned to direct the cooled liquid or liquid suspension into one or more of the inflow pipes 32, 9, 58, and 110.

Using these cooling systems permit the previous water cooled items to operate at up to 600-700 degrees F. while the prior art water cooled systems operated at 125-200 degrees F. This substantial difference will usually increase the capacity and definitely will reduce the cost of melting significantly while also optionally producing much hotter air for other cost saving operations, like drying, preheating batch or other things, producing steam, and producing much more heat for HVAC systems. Most water cooled melter shells, cooling cans, electrode holders, electrodes, bubbler tubes, and other water cooled items in melting furnaces are of sufficient temperature resistance to operate at the temperatures permitted by the high temperature cooling fluids and fluid suspensions used in the invention, but if a more temperature resistant material is required it is well within the ordinary skill of this art to select a suitable metal or alloy for use in the invention.

When SS, stainless steel is used what is meant is those types of stainless steel having good corrosion resistance and strength at the temperatures that can exist on or colse to the surface of the crowns of tank type melters. When refractory metals or refractory metal alloys are used what is meant are those metals like nickel, molybdenium, etc. and alloys like tungsten nickel-chromium alloys with or without cobalt and similar metals and alloys that can resist oxidation and loss of substantial form and/or strength after prolonged time at the temperatues that will be present in the environment in which they are used in the invention.

The invention also includes metal or metal alloy surface linings for glass melters, especially for use in the fastest wear areas of the refractory linings of the melters, and methods of lining glass melters to substantially increase the life of the glass melters by using thin sheet(s) of precious metal and/or of a refractory and corrosion resistant metal alloy, attached to the surface of the refractory lining, especially in the areas of fastest wear of the melter linings. The prefered precious metal or alloys are those containing at least 35 wt. percent of Rhodium including Rhodium metal, with or without one or more other precious metals and/or refractory metals. The highest wear area on the linings is at, several inches above and several inches below the metal line, also, in the bottom of melters using bottom electrodes around the holes where the electrodes come through the refractory lining, and also in the sidewalls of electric melters in the sidewall linings for a distance out from where the electrodes come through the sidewall linings. FIGS. 2 and 6 show embodiments of protecting the refractory in the region of the metal lines, i.e. top of the melt, and a few inches above and below the metal line. In FIG. 2, a strip 323 of precious metal or precious metal alloy, or refractory metal or refractory metal alloy is attached to the refractory 25 to extend above the top of the metal line 19, above the batch cover 58 and below the metal line as far as the normal high wear area of the refractory lining 25. In FIG. 6 strips 325 run down the interior of the length of the sidewalls 4, in the normal high wear areas, of tank 4, spanning the metal line of melt 74, extending down to cover the normal area of high wear and extending upward covering the batch layer and/or the foam layer and covering the normal high wear areas. Given the disclosure herein, t is within the skill of those of ordinary skill in melting furnaces to place the corrosion and oxidaton resistant metal strips in the normally high wear areas to protect the linings.

Very high melting point precious metals and alloys, and very high melting point refractory metals and alloys having a melting points above 2400 or 2500 or 2550 or 2600 degrees F., preferably above 2650 degrees and higher are suitable for this purpose, particularly those having good oxidation resistance at the use temperatures. The types of Rhodium, (Rh), alloys most usable in protecting high wear areas of glass melting furnaces include Rh plus one or more of Platinum, Irridium, and also Paladium, Tungsten, Rhenium, Ruthenium, Osmium, Tantalum, Silicon, Scandium, Titanium, Vanadium, Chromium, Manganese, Nickel, Yytrium, Zirconium, Niobium, Holmium, Erbium, Thulium, Lutetium, Hafnium, Tantalum, Thorium, Platnium, Rhenium, Ruthenium, and Irridium being the most preferred alloying metals and Tungsten, Tantalum, Chromium, Nickel and Zirconium being also preferred. Alloys of Rh containing more than 35 wt. % Rh, more preferably more than 40 or 45 wt. %, and alloys having similar high temperature properties, especially the properties of strength, oxidation resistance and corrosion resistance to molten glasses at temperatures as high as 2400, 2500, 2600, 2700, 2800 and 2900 degrees F. and higher.

The protective sheet(s) can be attached to the refractory lining In several ways including folding over a short length and inserting the folded over strip or strips into joints between refractory blocks or into a slit cut in the refractory blocks or lining and using refractory cement on the back side of the sheet or with and/or in the joints or slit in the refractory blocks. The sheet(s) can also have a few spaced apart holes therein and headed pins of the same metal or alloy as the sheet can be put through the holes and into appropriate located holes drilled into the inner faces of the refractory lining blocks or other lining.

Most of the protective precious metal refractory metal or an alloy of two or more of these metals will survive the life of the furnace and can be recovered by known processes, even from the refractories under or adjacent and close to the protective sheets where metal and/or alloy vapors condense on/in the refractories. This recovery will either make the use of the protective sheets economically feasible or will make their use even more financially attractive.

The advantages of the above inventions are numerous including boosting the output of existing footprint tank melters, increasing the quality of the melt exiting the tank melter or both. While one might question the melt quality assertion since the melt is in the refining zone C of the tank melter for a shorter time due to the higher discharge of melt, the assertion is valid because the hot spot(s) are moved closer to the batch feed end of the tank providing faster melting of the batch cover and longer refining time for the molten glass while at higher temperatures. Other advantages include higher efficiency of the HSM melters when a higher temperature cooling fluid makes the HSM melter more electrical energy efficient since less heat is removed by the cooling system and faster startups are permitted by the preheating of the HSM melters, particularly the KTEM melters by the higher temperature cooling fluid. Also, improved melting rate and batch feeding and batch cover is maintained with less dust loss and dust problems by the pelletizing of the batch and batch feeder of the invention. The invention makes use of the shortcomings of each of the tank type melters (difficulty to drive heat through the batch and/or foam layers and into the interior of the melt in the batch feed end portion of the tank, high heat losses in water cooled electrode holders and bubblers and high wear in the area of he metal line in portions of the length of the tank) and the shortcommings of the HSM melters (undesirable high temperature of the exiting melt stream, high heat losses due to water cooling and high wear of the lining in the area of the metal line) to correct and benefit from the each others shortcommings. While each type of melters have existed for several decades, the inventon has escaped the ways of boosting tank type melters until the present invention.

In addition, as mentioned above, it has been recognized for many years that increasing the temperature in the melt interior in the batch feed end of the tank has substantial positive effects on the melt rate and capacity of the tank type melters, but the ability to achieve the desired temperature in this portion of the melt has been limited prior to this invention. It is also known, from http//tristate.apogee,net/et/efisgec.asp, that the energy efficiency for melting glass in a tank type fossil fuel melter is much lower, 30-55 percent efficient, than the energy efficiency for melting glass in an electric melter, 71-76 percent efficient. Thus boosting tank melters with electric HSM melters in accordance with the present invention is much more cost effective than submerged gas/air orgas/oxygen melting, and without the serious problems of additional foam, bubbles and seeds in the molten glass.

The present invention preferably uses one or more circular open-top electric HSM melters like those described herein including KTEMs. While it is preferred to use high temperatue cooling fluid useable to 750 degrees F. or higher for cooling, nevertheless the cooling for the shell of a KTEM melter and other normally water cooled parts can continue to be cooled with water if desired. When cooling components of a tank type melter such as electrode holders and bubbler assemblies, either a single heat exchanger or separate heat exchangers can be used to cool the hot high temperature liquid or liquid suspension.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

The invention claimed is:

1. A system for producing molten glass from batch material the system comprising:
   a conventional tank type melter for producing molten glass from glass batch; the tank type melter having a capacity of at least 75 tons/day prior to boosting with one or more electric melters as described below, and the tank melter further comprising:
   a) a front end; and
   a rear end opposite the front end wherein molten glass flows from the front end to the rear end; and
   a bottom capable of holding a melt pool of molten glass; and
   a crown opposite the bottom; and
   at least one side wall connecting the top, bottom, front end and rear end;
   a batch entry point at the front end and capable of receiving batch materials from a batch source,
   a plurality of heating electrodes and/or a plurality of burners placed in the side walls,
   one or more openings through the crown of the tank type melter configured to allow one or more molten glass streams to pass through and into the melt pool,
   a) at least one electric melter, each comprising:
      an outlet located in a bottom or side portion of said electric melter
      electric heating means, and said electric melter capable of emitting a melt stream of molten material having a temperature of at least 2500 degrees F. through said outlet,
   b) one or more mounts configured to support the at least one electric melter above a surface of the melt pool in the tank melter, relative to gravity, such that the outlet of the one or more electric melters;
      a. said mount comprising:
      a platform configured to hold the electric melter and deliver molten glass stream from the electric melter to the melt pool of the tank melter;
      at least one support configured to hold said platform; and
      at least one brace connecting said platform to said at least one support.

2. The system of claim 1 wherein at least one of the one electric melters is or are mounted to be moved back and forth on said structure to move the falling melt stream(s) back and forth as said stream or streams enter said pool.

3. The system of claim 1 wherein the said at least one electric melter is or are mounted above the top of the tank melter.

4. The system of claim 2 wherein the said at least one electric melter is or are mounted above the top of the tank melter.

5. The system of claim 2 wherein the temperature of the melt stream exiting at least one of the one or more said at least one electric melter is at least 2600 degrees F.

6. The system of claim 3 wherein the temperature of the super hot melt stream exiting at least one of the one or more said at least one electric melter is at least 2600 degrees F.

7. The system of claim 1 further comprising an insulated melt stream protection device surrounding at least a portion of the falling melt stream below the said electric melter and above the top of the tank type melter to reduce heat losses from the melt stream.

8. The system of claim 2 further comprising an insulated melt stream protection device surrounding at least a portion of the falling melt stream below the said electric melter and above the top of the tank type melter to reduce heat losses from the melt stream.

9. The system of claim 2 further comprising one or more refractory shields configured to cover a portion of the opening(s) in the top of the tank type melter to reduce heat losses from the tank type melter.

10. The system of claim 1 further comprising one or more refractory diverters that each intercept a stream of the melt and oscillates the stream of the melt in a desired pattern prior to said stream falling onto the said pool in the tank type melter.

* * * * *